United States Patent
Wang et al.

(10) Patent No.: US 12,491,588 B2
(45) Date of Patent: Dec. 9, 2025

(54) WELDING POSITIONING APPARATUS, BATTERY PRODUCTION LINE, AND WELDING METHOD

(71) Applicant: CONTEMPORARY AMPEREX TECHNOLOGY CO., LIMITED, Ningde (CN)

(72) Inventors: Tengteng Wang, Ningde (CN); Kun Yang, Ningde (CN); Xiang Fan, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/210,045

(22) Filed: May 16, 2025

(65) Prior Publication Data

US 2025/0276413 A1    Sep. 4, 2025

Related U.S. Application Data

(63) Continuation of application No. PCT/CN2024/110118, filed on Aug. 6, 2024.

(30) Foreign Application Priority Data

Jan. 30, 2024  (CN) .......................... 202410123451.8

(51) Int. Cl.
   *B23K 37/04* (2006.01)
   *H01M 10/04* (2006.01)
(52) U.S. Cl.
   CPC ..... *B23K 37/0408* (2013.01); *H01M 10/0404* (2013.01); *H01M 10/0481* (2013.01)
(58) Field of Classification Search
   CPC ............ B23K 37/0426; B23K 37/0408; B23K 37/0435; B23K 37/0443; B23K 37/0461;
   (Continued)

(56) References Cited

U.S. PATENT DOCUMENTS

| | | | |
|---|---|---|---|
| 2014/0230226 A1* | 8/2014 | Kitagawa | H01M 10/0404 29/800 |
| 2021/0098766 A1* | 4/2021 | Ban | B23K 20/22 |
| 2024/0017361 A1* | 1/2024 | Que | B23K 26/16 |

FOREIGN PATENT DOCUMENTS

| | | |
|---|---|---|
| CN | 207840520 U | 9/2018 |
| CN | 109148938 A | 1/2019 |

(Continued)

OTHER PUBLICATIONS

CN-115041802-A translation (Year: 2022).*

(Continued)

*Primary Examiner* — Helen Oi K Conley
*Assistant Examiner* — Amanda Rosenbaum
(74) *Attorney, Agent, or Firm* — Ladas & Parry LLP

(57) ABSTRACT

A welding positioning apparatus includes a carrier and a pressing module. The carrier includes a pressing region and placement regions, where the pressing region is formed between two placement regions spaced apart along a first direction. The pressing module includes a pressing block and a driving apparatus, where the driving apparatus is drivingly connected to the pressing block to drive the pressing block to move toward the pressing region along a second direction. A side of the pressing block facing the pressing region is provided with a pressing surface and an avoidance space. The pressing surface is configured to press a portion of a tab of an electrode assembly along the second direction. The avoidance space is located on a side of the pressing surface along the first direction and is open on a side facing the pressing region.

18 Claims, 10 Drawing Sheets

(58) Field of Classification Search
CPC ............ B23K 37/0452; B23K 2101/38; B23K 2101/36; H01M 10/0404; H01M 10/0481
See application file for complete search history.

(56) References Cited

FOREIGN PATENT DOCUMENTS

| | | | | | |
|---|---|---|---|---|---|
| CN | 212734801 | U | | 3/2021 | |
| CN | 115041802 | A | * | 9/2022 | ............ B23K 20/26 |
| CN | 217344250 | U | | 9/2022 | |
| CN | 218051074 | U | * | 12/2022 | ............ B23K 26/16 |
| CN | 218695333 | U | | 3/2023 | |
| CN | 219188973 | U | | 6/2023 | |
| CN | 116638183 | A | | 8/2023 | |
| CN | 219986670 | U | | 11/2023 | |
| CN | 220050620 | U | | 11/2023 | |
| CN | 220127852 | U | | 12/2023 | |
| CN | 117644352 | A | | 3/2024 | |
| JP | 2017103115 | A | | 6/2017 | |
| JP | 2018041555 | A | | 3/2018 | |
| WO | 2022180217 | A1 | | 9/2022 | |

OTHER PUBLICATIONS

International Search Report in the international application No. PCT/CN2024/110118, mailed on Nov. 1, 2024, 6 pages with English translation.
Written Opinion of the International Search Authority in the international application No. PCT/CN2024/110118, mailed on Nov. 1, 2024, 8 pages with English translation.
First Office Action of the Chinese application No. 202410123451.8, issued on Mar. 6, 2024, 12 pages with English translation.

* cited by examiner

WELDING POSITIONING APPARATUS, BATTERY PRODUCTION LINE, AND WELDING METHOD

CROSS-REFERENCE TO RELATED APPLICATIONS

This application is a continuation of International application PCT/CN2024/110118 filed on Aug. 6, 2024 that claims priority to Chinese Patent Application No. 202410123451.8, filed on Jan. 30, 2024. The content of these applications in incorporated by reference herein in its entirety.

TECHNICAL FIELD

Embodiments of this disclosure relate to the technical field of battery production, specifically to a welding positioning apparatus, a battery production line, and a welding method.

BACKGROUND

In recent years, the new energy industry has flourished. As an indispensable part of the new energy industry, batteries require strict quality control in their production process, which affects performance, safety, cost, and various other aspects.

A battery includes battery cells, and an electrode assembly is provided within the battery. The electrode assembly refers to an electrochemical component formed by combining a positive electrode plate, a negative electrode plate, and a separator through winding or stacking.

Electrical connection between the tabs of the electrode assemblies and poles on a cover plate of the battery cell needs to be achieved via adapting pieces.

During the production process of the battery cell, the tab of the electrode assembly needs to be connected to the adapting piece by welding. The welding quality between the two directly impacts the production quality of the electrode assembly.

SUMMARY

In view of this, embodiments of this disclosure aim to provide a welding positioning apparatus, a battery production line, and a welding method that are conducive to improving the welding quality between a tab of an electrode assembly and an adapting piece.

To achieve the above purpose, the technical solutions of the embodiments of this disclosure are implemented as follows:

An embodiment of this disclosure provides a welding positioning apparatus for welding a tab of an electrode assembly to an adapting piece. The welding positioning apparatus includes:

a carrier including a pressing region and at least two placement regions for placing individual electrode assemblies, where the pressing region is formed between two placement regions spaced apart along a first direction, and the pressing region is configured to accommodate the tab and the adapting piece; and a pressing module including a pressing block and a driving apparatus, where the driving apparatus is drivingly connected to the pressing block to drive the pressing block to move toward the pressing region along a second direction, the second direction is orthogonal to the first direction, a side of the pressing block facing the pressing region is provided with a pressing surface and an avoidance space, the pressing surface is configured to press a portion of the tab of the electrode assembly along the second direction, the avoidance space is located on a side of the pressing surface along the first direction and is open on a side facing the pressing region, and the avoidance space is configured to accommodate another portion of the tab of the electrode assembly when the pressing surface presses a portion of the tab of the electrode assembly.

The welding positioning apparatus in this embodiment of this disclosure provides an avoidance space on the pressing block of the pressing module capable of accommodating a portion of the tab of the electrode assembly. This allows the pressing surface of the pressing block to press the tab of the electrode assembly currently requiring welding while enabling the tab of the electrode assembly not requiring welding in the current welding process to enter the avoidance space. This configuration reduces the probability of the tab not requiring welding in the current welding process being subjected to pressing forces along the second direction, thereby decreasing the probability of indentations or damage to the tab due to premature pressing before welding. Additionally, this reduces the probability of the unwelded tab being lifted by the pressing head due to static electricity or vacuum adsorption after the pressing head disengages along the second direction, which could cause bending or interleaving of the tab's layers. Consequently, this effectively improves the welding quality of the subsequent tab with the adapting piece, contributing to the production quality of the battery cell.

In some embodiments, a side of the avoidance space facing away from the pressing surface along the first direction is open.

This helps the tab of the electrode assembly to pass through this open position along the first direction, reducing the probability of contact between the pressing block and the tab not requiring welding.

In some embodiments, the pressing block is provided with a welding chamber, the welding chamber is located on a side of the pressing surface facing away from the pressing region, a side of the welding chamber away from the pressing surface along the second direction is open to form a first opening, an inner wall of the welding chamber on a side close to the pressing surface along the second direction is provided with a welding hole, and the welding hole penetrates the pressing block along the second direction.

This allows a welding portion of a welding device to extend into the welding chamber through the first opening for welding operation. The sidewalls of the welding chamber shield dust generated during the welding process, reducing dust adhesion to other tabs to be welded, thereby facilitating improved welding quality between the subsequent tab and the adapting piece. This also enables the welding portion of the welding device to pass through the welding hole to perform welding operation on the adapting piece and the tab.

In some embodiments, the pressing block includes a pressing plate, a first baffle, and a second baffle, the first baffle and the second baffle are spaced apart along the first direction and both extend along the second direction, the pressing plate is connected between the first baffle and the second baffle and is located at an end of both baffles close to the pressing region along the second direction, at least a portion of a surface of the pressing plate facing the pressing region forms the pressing surface, the pressing plate, the first baffle, and the second baffle collectively enclose the welding chamber, the welding hole is provided on the pressing plate, and the avoidance space is provided on a side of the second baffle facing away from the pressing plate along the first direction.

This configuration allows the first pressing plate and the second pressing plate to block welding dust during the welding process, contributing to improved welding quality. As the pressing block moves toward the pressing region along the second direction, a surface of the first pressing plate facing away from the second pressing plate along the first direction contacts the pressed tab and guides the electrode plates toward the adapting piece, providing a guiding function to prevent the tab from scraping against the edges of the pressing plate and from being damaged. The second pressing plate separates the welding chamber from the avoidance space, thereby protecting the tab located within the avoidance space.

In some embodiments, at least a portion of a side surface of the second baffle facing away from the first baffle is a sloped surface, the sloped surface is located at an end of the second baffle close to the pressing region along the second direction, and the sloped surface gradually moves away from the pressing plate in a direction away from the pressing region.

This enhances the guiding function of the second baffle, reducing the probability of the second baffle scraping the tab during contact between the second baffle and the tab and causing damage to the tab.

In some embodiments, the pressing block further includes a third baffle, an end of the second baffle away from the pressing plate along the second direction is connected to the third baffle, the third baffle extends along the first direction in a direction away from the pressing plate, and the second baffle and the third baffle collectively enclose the avoidance space.

This configuration enhances protection of the tab within the avoidance space via the third baffle, further reducing the probability of dust from the welding process adhering to the tab not requiring welding.

In some embodiments, the pressing block further includes a connecting plate and a mounting base, the connecting plate extends along the second direction and is connected between the first baffle and the second baffle, an end of the connecting plate close to the pressing region along the second direction is connected to the pressing plate, the connecting plate, the pressing plate, the first baffle, and the second baffle collectively enclose the welding chamber, the mounting base is provided at an end of the connecting plate away from the pressing region along the second direction and is located on a side of the connecting plate facing away from the welding chamber, the mounting base extends perpendicular to the second direction, and the mounting base is drivingly connected to the driving apparatus.

This configuration has several advantages. On one hand, a surface of the connecting plate facing the pressing plate forms a portion of the inner wall of the welding chamber, further enhancing the blocking effect against dust during the welding process, thereby contributing to improved welding quality of the tab. On the other hand, the connecting plate connects the first baffle and the second baffle, reducing the probability of deformation under pressing forces that could alter the spacing between the two baffles. Additionally, the connecting plate supports the pressing plate along the second direction, reducing the probability of bending or deformation of the pressing plate along the second direction. This enhances the overall connection strength among the connecting plate, the pressing plate, the first baffle, and the second baffle, reducing the risk of deformation of the pressing block under pressure. The mounting base is provided on a side of the connecting plate facing away from the welding chamber to minimize interference of the mounting base with the welding device during the welding process. The driving connection between the mounting base and the driving apparatus helps to increase the contact area at the connection position between the pressing block and the driving apparatus, reducing pressure during the pressing process, lowering the risk of deformation of the pressing block under pressure, and helping to enhance the connection strength at the connection position of the pressing block.

In some embodiments, at least one side of the welding chamber along a third direction is open to form a second opening, where the first direction, the second direction, and the third direction are mutually orthogonal.

This allows the welding portion of the welding device to enter and exit the welding chamber through the first opening and the second opening, increasing the number of relative movement paths between the welding portion of the welding device and the pressing block, enhancing operational flexibility, and reducing the probability of collision between the two.

In some embodiments, the pressing module further includes an adapting assembly, the adapting assembly includes a first adapting member, a second adapting member, and an elastic member, the first adapting member is drivingly connected to the driving apparatus, the first adapting member and the second adapting member are spaced apart along the second direction, the elastic member is connected between the first adapting member and the second adapting member, the elastic member is capable of elastic expansion and contraction along the second direction, and the second adapting member is connected to the pressing block.

This configuration allows relative movement between the first adapting member and the second adapting member along the second direction, causing elastic deformation of the elastic member along the second direction. The sum of the elastic force generated by the elastic member and the pressing force of the pressing block balances the driving force of the driving apparatus, ensuring that the pressing force applied by the pressing block to the tab remains within the designed range, thereby reducing the probability of damage to the tab due to excessive pressing force.

In some embodiments, the adapting assembly further includes a guide rod and a linear bearing, one of the guide rod and the linear bearing is provided on the first adapting member, the other is provided on the second adapting member, and the guide rod extends along the second direction and is inserted into the linear bearing.

This configuration constrains the movement of the first adapting member and the second adapting member along the second direction through the mutual restriction between the guide rod and the linear bearing, reducing the probability of relative movement between the first adapting member and the second adapting member in a direction perpendicular to the second direction, which could prevent the pressing block from pressing the tab. Additionally, this reduces the probability of the two ends of the elastic member in the second direction moving relatively in a direction perpendicular to the second direction, which could subject the elastic member to shear forces, thereby providing some protection to the elastic member.

In some embodiments, the pressing module further includes a frame, the adapting assembly further includes a shield member, the shield member is provided on the second adapting member, the frame is provided with a pressing position sensor and a separation position sensor, the pressing position sensor and the separation position sensor are spaced apart along the second direction, the pressing position sensor is located on a side of the separation position sensor close to the carrier along the second direction, and the shield member is capable of entering a sensing region of the pressing position sensor and a sensing region of the separation position sensor along the second direction, separately.

This configuration allows the pressing position sensor and the separation position sensor to more accurately determine the actual position of the pressing block along the second direction, reducing the probability of over-pressing or under-pressing issues with the pressing block.

In some embodiments, one of the pressing region and the pressing block is provided with a positioning pin, the other is provided with a positioning hole, the positioning pin protrudes along the second direction, the positioning hole is open on a side facing the positioning pin along the second direction, and the positioning pin is capable of being inserted into the positioning hole along the second direction.

This configuration allows the positioning pin to be inserted into the positioning hole before the pressing block reaches a preset pressing position. The inner wall of the positioning hole forms a stopping fit with the positioning pin perpendicular to the second direction, constraining the relative position between the pressing block and the pressing region perpendicular to the second direction, thus enabling the pressing block to more accurately press the tab at a preset position.

In some embodiments, the pressing module further includes at least two leveling plates, the two leveling plates are spaced apart along the first direction, the pressing block is provided between the two leveling plates, the driving apparatus is drivingly connected to the leveling plates, and the leveling plates are configured to press the electrode assemblies in the placement regions along the second direction, respectively.

This configuration allows contact between the leveling plates and the electrode assemblies, where friction between them suppresses the tendency of the electrode assemblies to move during the welding process. Additionally, the leveling plates shield the electrode assemblies, reducing the adverse effects of dust from the welding process on the electrode assemblies.

In some embodiments, the carrier includes a support plate and a plurality of positioning plates, the plurality of positioning plates extend along the second direction, the plurality of positioning plates are divided into at least two groups, each group including at least two positioning plates, the two groups of positioning plates are spaced apart along the first direction with the pressing region located between the two groups of positioning plates, the placement region is located on a side of one group of positioning plates facing away from the pressing region along the first direction, two positioning plates in each group are spaced apart along a third direction to form a gap for the tab to pass through and extend into the pressing region, and the first direction, the second direction, and the third direction are mutually orthogonal.

This configuration allows the electrode assemblies placed in the placement regions to abut the positioning plates along the first direction, ensuring that the spacing between different electrode assemblies along the first direction meets design requirements through at least two groups of positioning plates. This helps the relative positioning between the adapting piece and the tab along the first direction to meet design requirements, effectively reducing the probability of the electrode assemblies moving along the first direction during the welding process, thereby contributing to improved quality of the welded product.

In some embodiments, the carrier further includes a plurality of first stop members, the plurality of first stop members are divided into at least two groups, each group including at least two first stop members spaced apart along the third direction, at least one group of first stop members is located on a side of one group of positioning plates facing away from the pressing region along the first direction and, together with this group of positioning plates, encloses the placement region, and the first stop members are configured to form a stopping fit with the electrode assembly along the third direction;

and/or, the carrier further includes at least two second stop members, and the second stop members are located on a side of one group of positioning plates along the first direction and spaced apart from this group of positioning plates along the first direction to collectively enclose the placement region, and the second stop members are configured to form a stopping fit with the electrode assembly along the first direction.

This configuration restricts the movement range of the electrode assembly in the placement region along the third direction through at least one group of first stop members, facilitating positional stability of the electrode assembly during the welding process, thereby contributing to improved welding quality. Positioning members and the second stop members collectively restrict the movement range of the electrode assembly in the placement region along the first direction, facilitating positional stability of the electrode assembly during the welding process, thereby contributing to improved welding quality.

An embodiment of this disclosure provides a battery production line for welding a tab of an electrode assembly to an adapting piece. The battery production line includes a welding device, a transport module, and the welding positioning apparatus according to any of the aforementioned embodiments. The welding device is configured to weld the tab and the adapting piece when the pressing surface presses the tab of one electrode assembly. The transport module is drivingly connected to the carrier to drive the carrier to move.

This configuration improves the positional accuracy of the welding operation of the welding device through the pressing and positioning of the electrode assembly and the adapting piece by the welding positioning apparatus. The avoidance space accommodates the tab not requiring welding in the current process, facilitating improved welding quality in subsequent welding operation. The transport module drives the carrier to move, adjusting the position of the carrier to facilitate loading and unloading operations while enabling unwelded electrode assemblies and adapting pieces to move to a preset operation position corresponding to the welding device.

An embodiment of this disclosure further provides a welding method for welding a tab of an electrode assembly to an adapting piece using the battery production line according to any of the aforementioned embodiments. The welding method includes:

loading operation: placing the adapting piece in the pressing region, placing the electrode assemblies in the placement regions, and positioning the tabs of at least two electrode assemblies in the pressing region such that the adapting piece and the tab are stacked along the second direction;

pressing operation: confirming that the carrier is at a preset operation position, and controlling the driving apparatus to drive the pressing block to move toward the pressing region along the second direction to a preset pressing position, such that the tabs of one or more electrode assemblies and the adapting pieces are clamped between the pressing surface and a surface of the pressing region, and the tabs of one or more electrode assemblies are located in the avoidance space; and welding operation: driving a welding portion of the welding device to move to a preset welding position, and controlling the welding portion to weld the tab pressed by the pressing surface and the adapting piece.

The welding method in this disclosure allows for accommodation of the tab not requiring welding in the current process within the avoidance space, reducing the probability of damage to the tab not requiring welding in the current process due to pressure, thereby ensuring that the welding quality of the tab in subsequent welding meets technical requirements.

In some embodiments, the battery production line further includes a positioning module, and a positioning end of the positioning module is telescopically configurable.

The confirming that the carrier is at the preset operation position specifically includes:

controlling the transport module to drive the carrier to move along a transport direction to the preset operation position; and controlling the positioning end to be inserted into a positioning groove of the carrier, such that an inner wall of the positioning groove forms a stopping fit with the positioning end along the transport direction.

This configuration achieves positional fixing of the carrier along its transport direction through the stopping fit between the inner wall of the positioning groove and the positioning end, reducing the probability of welding failure due to carrier movement during the welding process.

In some embodiments, before the controlling the driving apparatus to drive the pressing block to move toward the pressing region along the second direction to a preset pressing position, the welding method further includes:

acquiring a cell presence signal emitted by a cell presence sensor when the electrode assembly in the placement region blocks a light beam emitted by the cell presence sensor.

This configuration enables better monitoring of the state of the electrode assembly in the carrier, reducing the risk of material waste in subsequent welding operation due to the electrode assembly falling off during movement with the carrier.

In some embodiments, the controlling the driving apparatus to drive the pressing block to move toward the pressing region along the second direction to a preset pressing position specifically includes:

controlling the driving apparatus to drive the adapting assembly to move toward the pressing region along the second direction until it is confirmed that the shield member of the adapting assembly enters the sensing region of the pressing position sensor.

This configuration reduces the adverse effects of positional errors of the pressing block along the second direction due to loosening of the connection between the adapting assembly and the driving apparatus or between components within the adapting assembly, enabling more accurate determination of the actual position of the pressing block along the second direction and reducing the probability of over-pressing or under-pressing issues with the pressing block.

Figure 1:
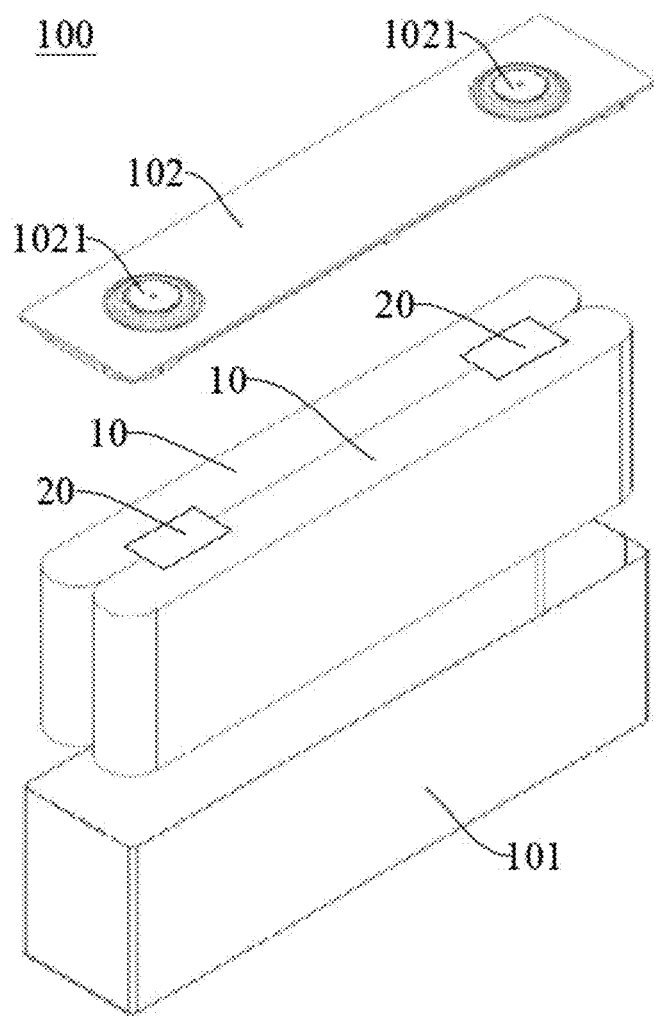
FIG. 1 is an exploded schematic diagram of a battery cell in an embodiment of this disclosure.

DESCRIPTION OF REFERENCE SIGNS 100. battery cell; 101. housing; 102. cover plate; 1021. pole; 10. electrode assembly; 11. tab; 20. adapting piece; 30. carrier; 30a. pressing region; 30b. placement region; 30c. positioning groove; 31. positioning pin; 32. support plate; 33. positioning plate; 34. first stop member; 35. second stop member; 40. pressing module; 41. pressing block; 41a. pressing surface; 41b. avoidance space; 41c. welding chamber; 41d. first opening; 41e. welding hole; 41f. second opening; 41g. positioning hole; 411. pressing plate; 412. first baffle; 413. second baffle; 414. third baffle; 415. connecting plate; 416. mounting base; 42. driving apparatus; 43. adapting assembly; 431. first adapting member; 432. second adapting member; 433. elastic member; 434. guide rod; 435. linear bearing; 436. shield member; 44. leveling plate; 45. pressing position sensor; 46. separation position sensor; 47. frame; and 48. cell presence sensor.

DETAILED DESCRIPTION

It should be noted that, unless conflicting, the embodiments and technical features within the embodiments of this disclosure may be combined with each other. The detailed descriptions in the specific embodiments should be understood as explanatory of the purpose of this disclosure and should not be regarded as unduly limiting this disclosure.

Unless otherwise defined, all technical and scientific terms used herein have the same meanings as commonly understood by persons skilled in the technical field of this disclosure. Terms used herein are solely for the purpose of describing specific embodiments and are not intended to limit this disclosure. The terms "including" and "having" and any variations thereof in the specification and the above description of drawings of this disclosure are intended to cover non-exclusive inclusion.

In the description of the embodiments of this disclosure, technical terms such as "first," "second," and "third" are used only to distinguish different objects and should not be construed as indicating or implying relative importance, or implicitly indicating the number, specific order, or primary-secondary relationship of the technical features indicated. In the description of the embodiments of this disclosure, "a plurality of" means two or more, unless explicitly and specifically limited otherwise.

Reference herein to "embodiment" means that a particular feature, structure, or characteristic described in connection with the embodiment may be included in at least one embodiment of this disclosure. The appearance of this phrase in various positions in the specification does not necessarily refer to the same embodiment, nor does it refer to an independent or alternative embodiment mutually exclusive with other embodiments. Persons skilled in the art explicitly and implicitly understand that the embodiments described herein may be combined with other embodiments.

In the description of the embodiments of this disclosure, the term "and/or" merely describes an associative relationship between associated objects, indicating three possible relationships. For example, A and/or B may indicate: A alone, A and B together, or B alone. Additionally, the character "/" herein generally indicates an "or" relationship between the associated objects before and after.

Figure 2:
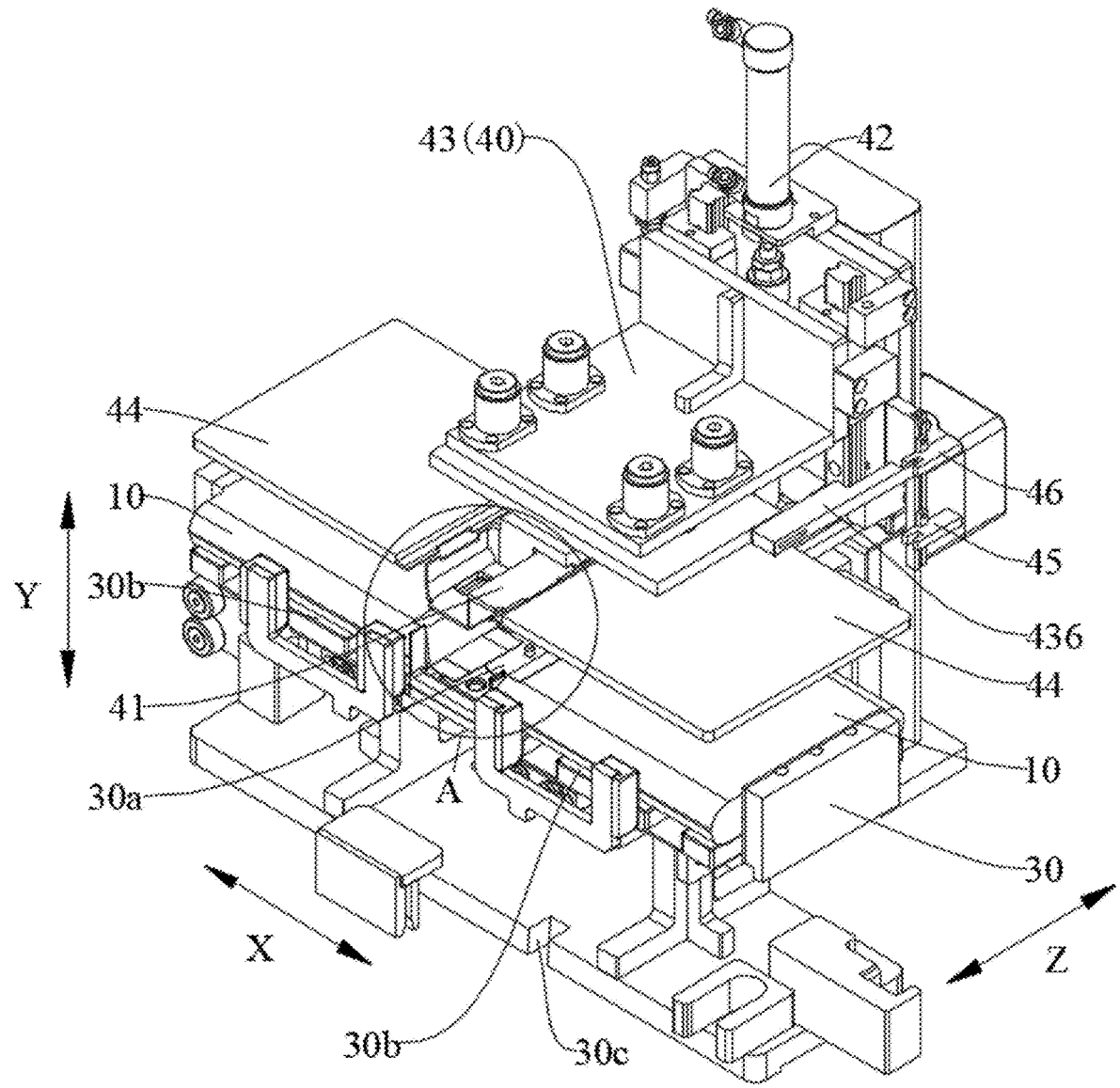
FIG. 2 is a schematic diagram of a welding positioning apparatus, an electrode assembly, and an adapting piece in a first perspective in an embodiment of this disclosure.
Figure 4:
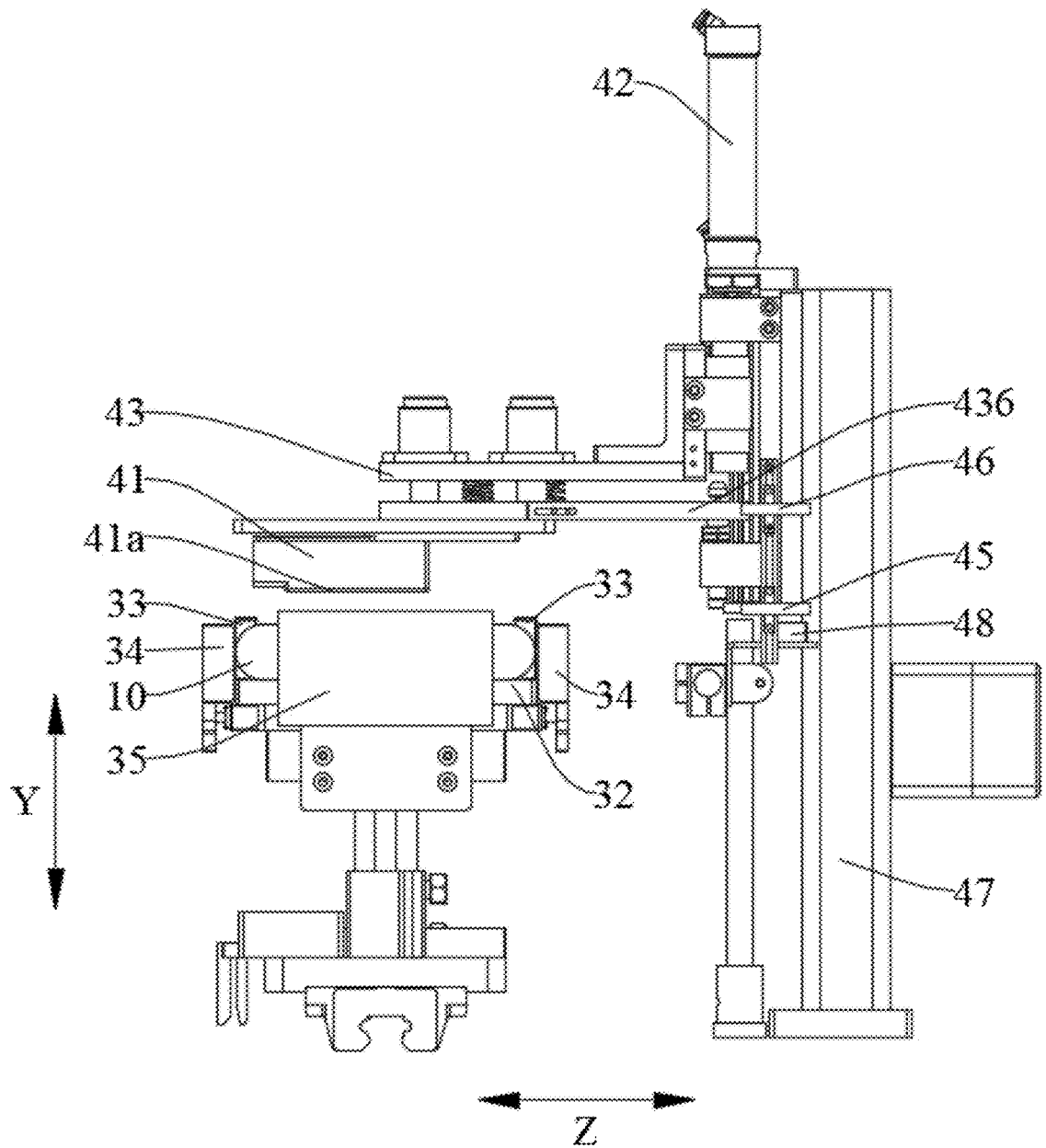
FIG. 4 is a schematic diagram of the embodiment of FIG. 2 in a second perspective.
Figure 5:
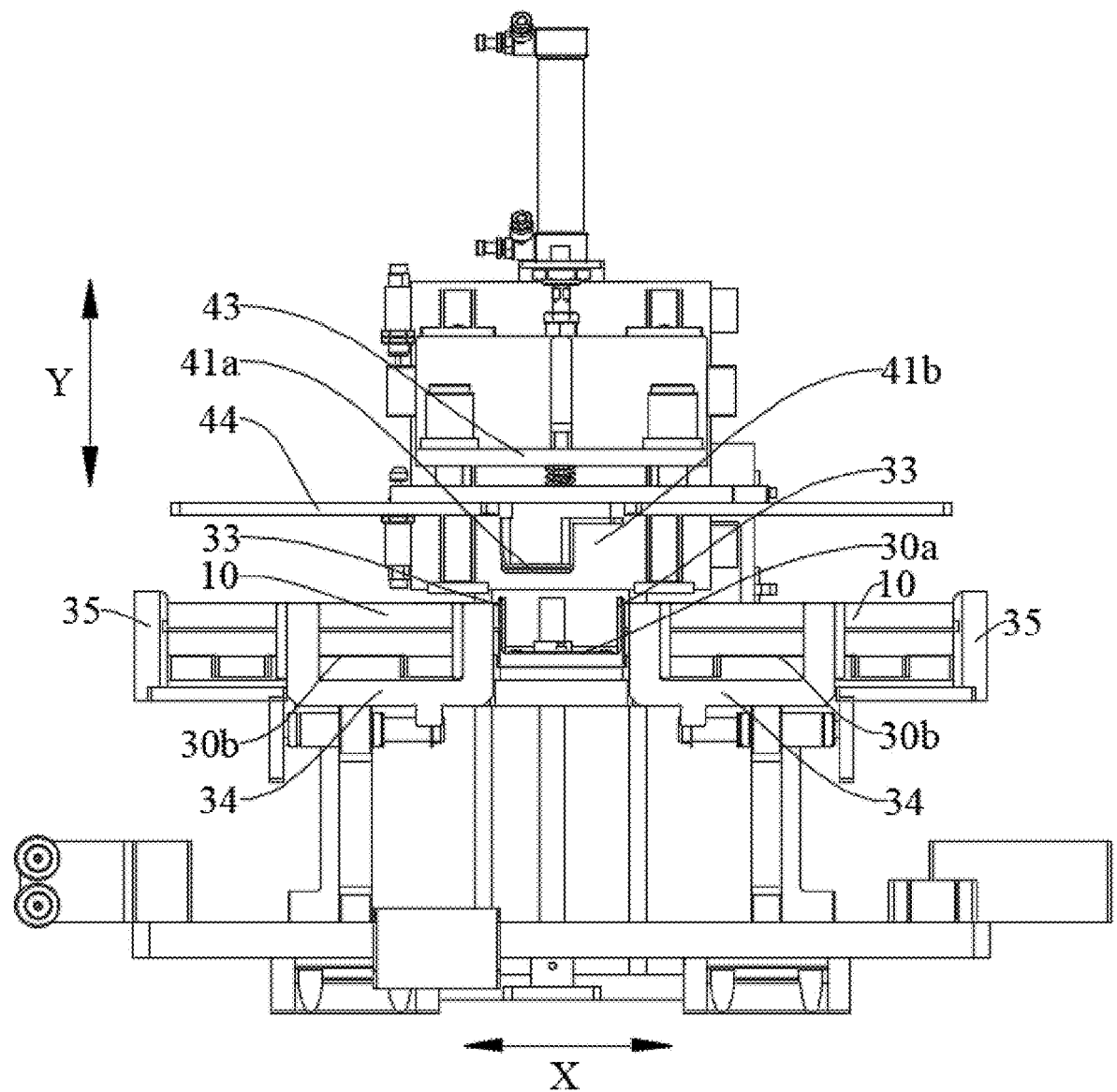
FIG. 5 is a schematic diagram of the embodiment of FIG. 2 in a third perspective.
Figure 6:
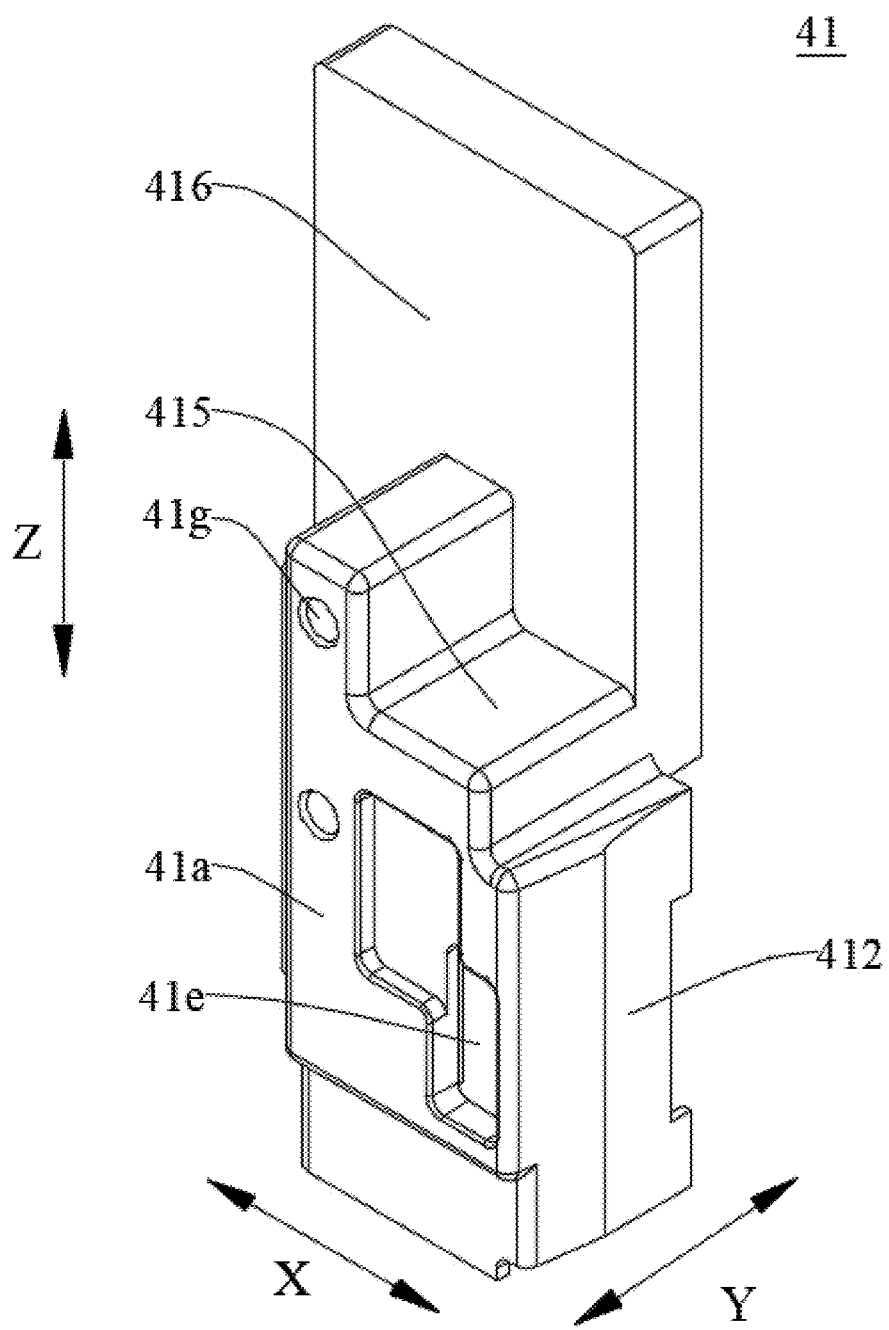
FIG. 6 is a schematic diagram of a pressing block in an embodiment of this disclosure.

In the description of the embodiments of this disclosure, for ease of explanation, as shown in FIG. 2, FIG. 5, and FIG. 6, the direction indicated by arrow X is the "first direction"; as shown in FIG. 2, FIG. 4, FIG. 5, and FIG. 6, the direction indicated by arrow Y is the "second direction"; and as shown in FIG. 2, FIG. 4, and FIG. 6, the direction indicated by arrow Z is the "third direction."

In the description of the embodiments of this disclosure, unless explicitly specified and limited otherwise, technical terms such as "install," "connect," "connection," and "fix" should be broadly understood. For example, a connection may be a fixed connection, a detachable connection, or an integral formation; it may be a mechanical connection or an electrical connection; it may be a direct connection or an indirect connection via an intermediate medium; it may be an internal communication between two elements or an interaction relationship between two elements. Persons skilled in the art can understand the specific meanings of the above terms in the embodiments of this disclosure based on specific circumstances.

In the description of the embodiments of this disclosure, unless explicitly specified and limited otherwise, the technical term "contact" should be broadly understood. It may refer to direct contact or contact via an intermediate medium layer; or it may refer to contact between two entities with essentially no mutual interaction force or contact between two entities with mutual interaction force.

Currently, batteries are increasingly widely used in daily life and industry. Batteries are not only applied in energy storage power systems such as hydropower, thermal power, wind power, and solar power stations but are also widely used in electric vehicles such as electric bicycles, electric motorcycles, and electric cars, as well as in aerospace and other fields. As the application fields of batteries continue to expand, the market demand for batteries is also continuously increasing.

A battery includes a case and battery cells 100. The battery cells 100 may be multiple, and multiple battery cells 100 may be connected in series, parallel, or a hybrid combination, where a hybrid combination refers to a mix of series and parallel connections among multiple battery cells 100. Multiple battery cells 100 may be directly connected in series, parallel, or a hybrid combination and then placed as a whole into an accommodation space of the case. Alternatively, the battery may be formed by first connecting multiple battery cells 100 in series, parallel, or a hybrid combination to form battery modules, and then connecting multiple battery modules in series, parallel, or a hybrid combination to form a whole accommodated in the accommodation space of the case. The battery may further include other structures. For example, the battery may further include a busbar configured to implement electrical connection between the plurality of battery cells 100.

Referring to FIG. 1, the battery cell 100 involved in the embodiments of this disclosure includes an electrode assembly 10 and an electrolyte. The electrode assembly 10 is composed of a positive electrode plate, a negative electrode plate, and a separator. The battery cell 100 operates primarily by the movement of metal ions between the positive electrode plate and the negative electrode plate. The positive electrode plate includes a positive electrode current collector and a positive electrode active material layer applied on a surface of the positive electrode current collector. A portion of the current collector uncoated with the positive electrode active material layer protrudes from the current collector coated with the positive electrode active material layer and the portion of the current collector uncoated with the positive electrode active material layer serves as a positive tab after lamination. Taking a lithium-ion battery as an example, the material of the positive electrode current collector may be aluminum, and the positive electrode active material may be lithium cobalt oxide, lithium iron phosphate, ternary lithium, or lithium manganese oxide. The negative electrode plate includes a negative electrode current collector and a negative electrode active material layer, the negative electrode active material layer being applied on a surface of the negative electrode current collector. A portion of the current collector uncoated with the negative electrode active material layer protrudes from the current collector coated with the negative electrode active material layer and the portion of the current collector uncoated with the negative electrode active material layer serves as a negative tab after lamination. The negative electrode current collector may be made of copper, and the negative electrode active material may be carbon, silicon, or the like. The separator may be made of PP (polypropylene, polypropylene), PE (polyethylene, polyethylene), or the like. Additionally, the electrode assembly 10 may have a wound structure or a stacked structure.

The battery cell 100 may be a secondary battery, where the secondary battery refers to a battery cell 100 that can be recharged to activate the active material for continued use after discharge of the battery cell 100.

The battery cell 100 may be a lithium-ion battery, sodium-ion battery, sodium-lithium-ion battery, lithium metal battery, sodium metal battery, lithium-sulfur battery, magnesium-ion battery, nickel-hydrogen battery, nickel-cadmium battery, lead-acid battery, or the like, and the embodiments of this disclosure are not limited thereto.

The battery cell 100 may be a cylindrical battery cell, a prismatic battery cell, a pouch battery cell, or of other shapes. Prismatic battery cells include square-shell battery cells, blade-shaped battery cells, and multi-prismatic battery cells, such as hexagonal prismatic battery cells, and the embodiments of this disclosure are not particularly limited thereto.

The embodiments of this disclosure are described in detail below.

In the related art, referring to FIG. 1, the battery cell 100 includes a housing 101, a cover plate 102, an electrode assembly 10, and an adapting piece 20. The housing 101 is provided with an accommodation cavity, and the electrode assembly 10 and the adapting piece 20 are disposed in the accommodation cavity, the accommodation cavity being filled with an electrolyte. One side of the accommodation cavity is open, and the cover plate 102 is sealingly disposed at the open position of the accommodation cavity, such that the electrode assembly 10 and the adapting piece 20 are in a sealed environment. The cover plate 102 is provided with a pole 1021. The adapting piece 20 is located on a side of the electrode assembly 10 facing the cover plate 102 and the adapting piece 20 is electrically connected to the electrode assembly 10 and the pole 1021. Thus, electrical energy generated by the electrochemical reaction between the electrode assembly 10 and the electrolyte can be output through the adapting piece 20 via the pole 1021, enabling discharge of the battery cell 100.

The electrode assembly 10 is provided with a tab 11, and the tab 11 serves as the positive or negative electrode of the electrode assembly 10 to be electrically connected to the adapting piece 20.

To achieve electrical conduction between the tab 11 and the adapting piece 20, welding is typically used to fixedly connect the two. Therefore, the welding quality between the adapting piece 20 and the tab 11 significantly affects the normal charging and discharging of the battery cell 100.

The electrode assembly 10 is formed by combining multiple positive electrode plates and multiple negative electrode plates through winding or stacking, with loose gaps formed between the layers of positive and negative electrode plates. In other words, a tab 11 of a certain polarity is formed by stacking portions of multiple electrode plates of that polarity. Therefore, during the welding of the adapting piece 20 and the tab 11, the tab 11 of each polarity needs to be pressed first to ensure tight stacking of the tab 11 of the same polarity before welding with the adapting piece 20. However, if the tab 11 to be welded is subjected to continued pressing before welding, quality risks such as folding or interleaving of the tab 11 are likely to occur.

An embodiment of this disclosure provides a welding positioning apparatus that synchronously provides a pressing surface 41a and an avoidance space 41b on the pressing head. This allows the pressing surface 41a to press the tab 11 requiring welding while enabling the tab 11 not requiring welding in the current welding process to enter the avoidance space 41b, avoiding compression by the pressing head.

Specifically, referring to FIG. 2 to FIG. 5, the welding positioning apparatus provided in the embodiments of this disclosure is used for welding the tab 11 of the electrode assembly 10 to the adapting piece 20. The welding positioning apparatus includes a carrier 30 and a pressing module 40.

The carrier 30 includes a pressing region 30a and at least two placement regions 30b for placing individual electrode assemblies 10. The pressing region 30a is formed between two placement regions 30b spaced apart along a first direction, and the pressing region 30a is configured to accommodate the tab 11 and the adapting piece 20.

The pressing module 40 includes a pressing block 41 and a driving apparatus 42. The driving apparatus 42 is drivingly connected to the pressing block 41 to drive the pressing block 41 to move toward the pressing region 30a along a second direction, and the second direction is orthogonal to the first direction. A side of the pressing block 41 facing the pressing region 30a is provided with a pressing surface 41a and an avoidance space 41b. The pressing surface 41a is configured to press a portion of the tab 11 of the electrode assembly 10 along the second direction. The avoidance space 41b is located on a side of the pressing surface 41a along the first direction and is open on a side facing the pressing region 30a. The avoidance space 41b is configured to accommodate another portion of the tab 11 of the electrode assembly 10 when the pressing surface 41a presses a portion of the tab 11 of the electrode assembly 10.

It can be understood that the adapting piece 20 is located on a side of the tab 11 facing away from the pressing block 41 along the first direction.

The carrier 30 is configured to accommodate the electrode assembly 10 and the adapting piece 20, enabling the tab 11 and the adapting piece 20 to be clamped between the carrier 30 and the pressing block 41. This allows the tab 11 to be compacted and kept in contact with the adapting piece under the supporting force of the carrier 30 and the pressing force of the pressing block 41, facilitating welding.

Each placement region 30b is configured to accommodate one electrode assembly 10, allowing individual electrode assemblies 10 to be placed independently, reducing mutual interference between the electrode assemblies 10 during the welding process. Simultaneously, multiple electrode assemblies 10 can be placed on one carrier 30, reducing the number of loading and unloading operations during the welding process and improving work efficiency.

When the electrode assembly 10 is placed in the placement region 30b, the tab 11 of the electrode assembly 10 is located in the pressing region 30a and on a side of the adapting piece 20 facing away from the carrier 30 along the second direction.

The pressing region 30a is located between two placement regions 30b, bringing the tabs 11 of the electrode assemblies 10 placed in the two placement regions 30b closer to each other. This helps to reduce the total time required for welding the tabs 11 of multiple electrode assemblies 10 to the adapting pieces 20, improving welding operation efficiency.

It can be understood that the electrode assembly 10 has at least two tabs 11, one tab 11 being of positive polarity and the other tab 11 being of negative polarity.

It can be understood that the specific number of adapting pieces 20 placed in the pressing region 30a is not limited. For example, the number of adapting pieces 20 is at least two, each adapting piece 20 being configured to connect the tabs 11 of the same polarity from two electrode assemblies 10. Alternatively, the number of adapting pieces 20 is at least four, each adapting piece 20 being configured for a single tab 11 of the electrode assembly 10.

The driving apparatus 42 has a driving end, and the driving end is capable of extending and retracting along the second direction to drive the pressing block 41 to move along the second direction.

The driving connection between the driving apparatus 42 and the pressing block 41 may be a direct connection between the driving apparatus 42 and the pressing block 41, or an indirect driving connection through a force transmission path formed by other structures.

The pressing surface 41a is configured to press the tab 11 along the second direction, compacting the tab 11 to be welded and keeping them in contact with the adapting piece 20, thus facilitating subsequent welding of the adapting piece 20 with the tab 11 to be welded.

The avoidance space 41b is located on a side of the pressing surface 41a along the first direction, meaning that the pressing surface 41a and the avoidance space 41b are arranged side by side along the first direction. The pressing surface 41a is close to one placement region 30b along the first direction, while the avoidance space 41b is close to another placement region 30b along the first direction. Thus, in a projection plane perpendicular to the second direction.

This at least contributes to that the projection of the tab 11 in at least one placement region 30b on one side along the first direction overlaps with the projection of the pressing surface 41a, and the projection of the tab 11 in at least one placement region 30b on the other side overlaps with the projection of the avoidance space 41b.

The avoidance space 41b is open on a side facing the pressing region 30a, allowing the tab 11 to enter and exit the avoidance space 41b through this open position.

The pressing block 41 moves toward the pressing region 30a until the pressing surface 41a presses against the tab 11 of at least one electrode assembly 10. Simultaneously, the tab 11 of at least one electrode assembly 10 on the other side along the first direction enters the avoidance space 41b through the open position of the avoidance space 41b. The pressing block 41 continues to move along the second direction to a preset pressing position, compacting the tab 11 in contact with the pressing surface 41a and bringing it into contact with the adapting piece 20, with at least a portion of the tab 11 of at least one electrode assembly 10 located in the avoidance space 41b.

The preset pressing position refers to a position where the pressing block 41 presses the electrode plates along the second direction to meet technical compaction requirements.

It can be understood that the tab 11 pressed by the pressing surface 41a is the tab 11 requiring welding with the adapting piece 20, while the tab 11 at least partially located in the avoidance space 41b is the tab 11 not requiring welding in the current process.

The welding positioning apparatus in the embodiments of this disclosure provides an avoidance space 41b on the pressing block 41 of the pressing module 40 capable of accommodating a portion of the tab 11 of the electrode assembly 10. This allows the pressing surface 41a of the pressing block 41 to press the tab 11 of the electrode assembly 10 currently requiring welding while enabling the tab 11 of the electrode assembly 10 not requiring welding in the current welding process to enter the avoidance space 41b. This configuration helps to reduce the probability of the tab 11 not requiring welding in the current welding process being subjected to pressing forces along the second direction, decreasing the probability of indentations or damage to the tab 11 due to premature pressing before welding. Additionally, this helps to reduce the probability of the unwelded tab 11 being lifted by the pressing head due to static electricity or vacuum adsorption after the pressing head disengages along the second direction, which could cause bending or interleaving of the layers of the tab 11. Consequently, this effectively improves the welding quality of the subsequent tab 11 with the adapting piece 20, contributing to the production quality of the battery cell 100.

It can be understood that the pressing surface 41a may be configured to press the tab 11 of only one electrode assembly 10 or the tabs 11 of multiple electrode assemblies 10. For example, referring to FIG. 2 to FIG. 5, the pressing surface 41a is configured to press the tab 11 of one electrode assembly 10.

It can be understood that the pressing surface 41a is a flat surface.

It can be understood that the avoidance space 41b may be configured to accommodate the tab 11 of only one electrode assembly 10 or the tabs 11 of multiple electrode assemblies 10. For example, referring to FIG. 2 to FIG. 5, the avoidance space 41b is configured to accommodate only the tab 11 of another electrode assembly 10 spaced apart along the first direction from the electrode assembly 10 pressed by the pressing surface 41a.

In some embodiments, referring to FIG. 4 and FIG. 5, the open position of the avoidance space 41b facing the pressing region 30a is on the same plane as the pressing surface 41a. This allows the pressing of the tab 11 by the pressing surface 41a and the entry of another tab 11 into the avoidance space 41b to occur synchronously, facilitating improved production rhythm. Additionally, this helps to reduce the dimension of the pressing block 41 along the second direction, making the structure of the welding positioning apparatus more compact.

It can be understood that contact between the avoidance space 41b and the tab 11 not requiring welding along the second direction should be avoided.

In some embodiments, a dimension of the avoidance space 41b along the second direction is greater than a dimension of the tab 11 along the second direction, facilitating a state where the inner wall of the avoidance space 41b along the second direction does not contact the tab 11 not requiring welding when the pressing surface 41a reaches the preset pressing position.

In some other embodiments, the avoidance space 41b penetrates the pressing block 41 along the second direction. In other words, the tab 11 not requiring welding moves with the pressing block 41, entering the avoidance space 41b from an end of the avoidance space 41b close to the pressing region 30a along the second direction and exiting the avoidance space 41b from an end away from the pressing region 30a.

In some embodiments, the first direction is a vertical direction, that is, a straight-line direction along the direction of gravity. This allows the carrier 30 to directly support the adapting piece 20 and the electrode assembly 10, reducing, through friction generated by contact, the probability of relative movement between the two during pressing by the pressing surface 41a.

Figure 3:
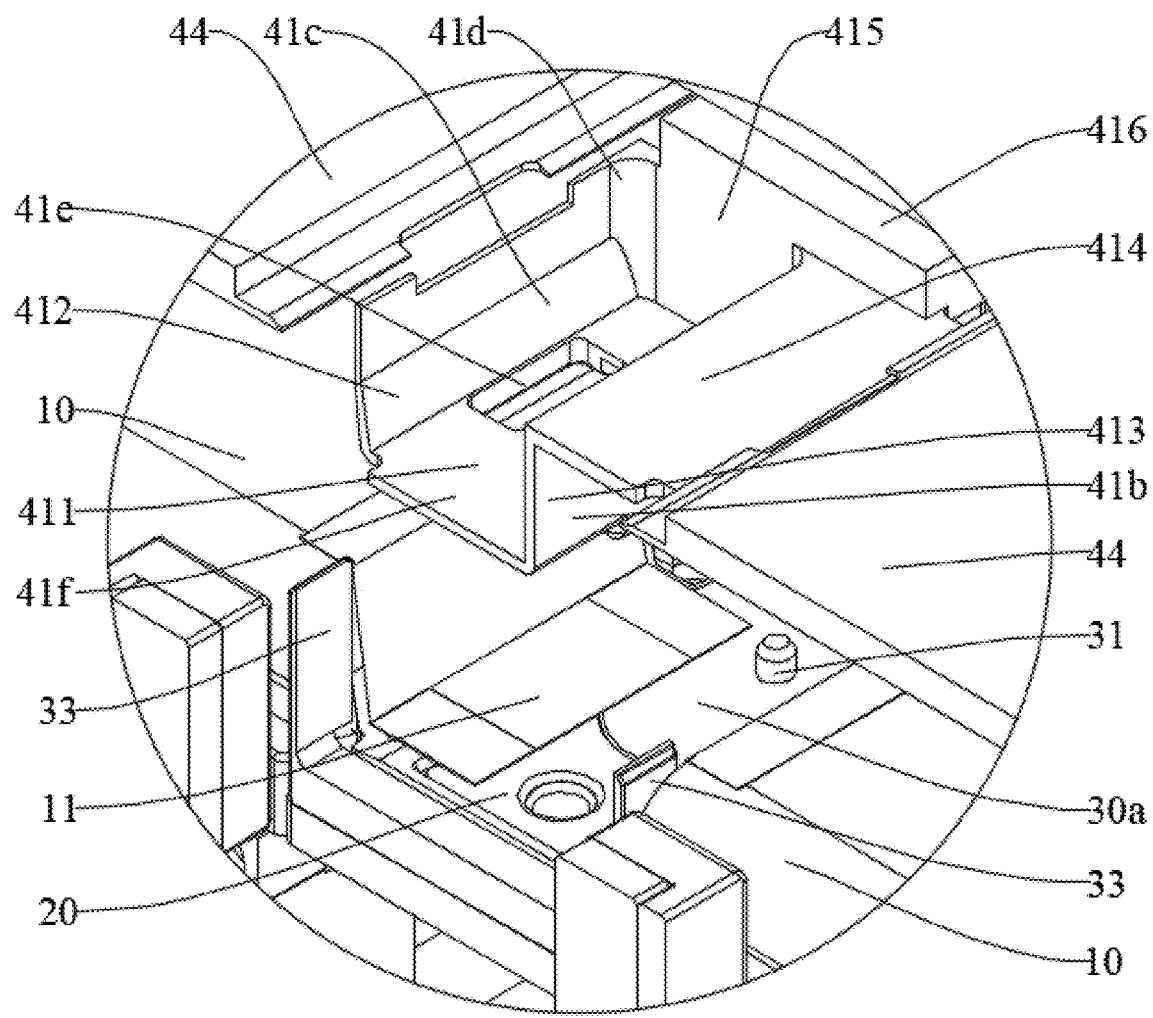
FIG. 3 is an enlarged schematic diagram of position A in the embodiment of FIG. 2.

In some embodiments, referring to FIG. 3, a side of the avoidance space 41b facing away from the pressing surface 41a along the first direction is open.

This helps the tab 11 of the electrode assembly 10 to pass through this open position along the first direction, reducing the probability of contact between the pressing block 41 and the tab 11 not requiring welding.

It can be understood that during the welding of the tab 11 and the adapting piece 20, the welding operation generates dust. Dust adhering to other unwelded tabs 11 affects the subsequent welding quality of those tabs 11.

In some embodiments, referring to FIG. 3, the pressing block 41 is provided with a welding chamber 41c, and the welding chamber 41c is located on a side of the pressing surface 41a facing away from the pressing region 30a. A side of the welding chamber 41c away from the pressing surface 41a along the second direction is open to form a first opening 41d.

This allows the welding portion of the welding device to extend into the welding chamber 41c through the first opening 41d for welding operation. The sidewalls of the welding chamber 41c shield dust generated during the welding process, reducing dust adhesion to other tabs 11 to be welded, thereby facilitating improved welding quality between the subsequent tab 11 and the adapting piece 20.

It can be understood that after extending into the welding chamber 41c, the welding portion of the welding device needs to pass through the pressing block 41 to perform welding operation on the adapting piece 20 and the tab 11.

In some embodiments, referring to FIG. 3 and FIG. 6, an inner wall of the welding chamber 41c on a side close to the pressing surface 41a along the second direction is provided with a welding hole 41e, and the welding hole 41e penetrates the pressing block 41 along the second direction.

This enables the welding portion of the welding device to pass through the welding hole 41e to perform welding operation on the adapting piece 20 and the tab 11.

It can be understood that in a projection plane perpendicular to the second direction, the projection of the welding position of the adapting piece 20 and the tab 11 lies within the projection range of the welding hole 41e.

The specific structural form of the welding chamber 41c is not limited.

For example, referring to FIG. 3 to FIG. 6, the pressing block 41 includes a pressing plate 411, a first baffle 412, and a second baffle 413. The first baffle 412 and the second baffle 413 are spaced apart along the first direction and both extend along the second direction. The pressing plate 411 is connected between the first baffle 412 and the second baffle 413 and is located at an end of both baffles close to the pressing region 30a along the second direction. At least a portion of a surface of the pressing plate 411 facing the pressing region 30a forms the pressing surface 41a. The pressing plate 411, the first baffle 412, and the second baffle 413 collectively enclose the welding chamber 41c. The welding hole 41e is provided on the pressing plate 411, and the avoidance space 41b is provided on a side of the second baffle 413 facing away from the pressing plate 411 along the first direction.

In other words, the pressing plate 411 is configured to press the tab 11 along the second direction. A side surface of the first pressing plate 411 facing the second pressing plate 411 and a side surface of the second pressing plate 411 facing the first pressing plate 411 form a portion of the inner wall of the welding chamber 41c.

This configuration allows the first pressing plate 411 and the second pressing plate 411 to block welding dust during the welding process, contributing to improved welding quality. As the pressing block 41 moves toward the pressing region 30a along the second direction, a surface of the first pressing plate 411 facing away from the second pressing plate 411 along the first direction contacts the pressed tab 11 and guides the electrode plates toward the adapting piece 20, providing a guiding function to prevent the tab 11 from scraping against the edges of the pressing plate 411 and from being damaged. The second pressing plate 411 separates the welding chamber 41c from the avoidance space 41b, thereby protecting the tab 11 located within the avoidance space 41b.

In some embodiments, referring to FIG. 6, at least a portion of a surface of the second baffle 413 facing away from the first baffle 412 is a sloped surface, and the sloped surface is located at an end of the second baffle 413 close to the pressing region 30a along the second direction. The sloped surface gradually moves away from the pressing plate 411 in a direction away from the pressing region 30a, enhancing the guiding function of the second baffle 413 and reducing the probability of the second baffle 413 scraping the tab 11 during contact between the second baffle 413 and the tab 11 and causing damage to the tab 11.

The specific method of forming the avoidance space 41b is not limited.

In some embodiments, referring to FIG. 3, the pressing block 41 further includes a third baffle 414. An end of the second baffle 413 away from the pressing plate 411 along the second direction is connected to the third baffle 414. The third baffle 414 extends along the first direction in a direction away from the pressing plate 411. The second baffle 413 and the third baffle 414 collectively enclose the avoidance space 41b.

A side surface of the third baffle 414 facing the pressing region 30a forms an inner wall of the avoidance space 41b on a side away from the pressing region 30a along the second direction.

This configuration enhances protection of the tab 11 within the avoidance space 41b via the third baffle 414, further reducing the probability of dust from the welding process adhering to the tab 11 not requiring welding.

It can be understood that the pressing plate 411 and the third baffle 414 are offset along the second direction, with the pressing plate 411 being closer to the pressing region 30a compared to the third baffle 414.

It can be understood that when the pressing block 41 presses the tab 11, its structural strength is sufficient to withstand the forces generated by the pressing.

In some embodiments, referring to FIG. 3 and FIG. 6, the pressing block 41 further includes a connecting plate 415 and a mounting base 416. The connecting plate 415 extends along the second direction and is connected between the first baffle 412 and the second baffle 413. An end of the connecting plate 415 close to the pressing region 30a along the second direction is connected to the pressing plate 411. The connecting plate 415, the pressing plate 411, the first baffle 412, and the second baffle 413 collectively enclose the welding chamber 41c. The mounting base 416 is provided at an end of the connecting plate 415 away from the pressing region 30a along the second direction and is located on a side of the connecting plate 415 facing away from the welding chamber 41c. The mounting base 416 extends perpendicular to the second direction and the mounting base 416 is drivingly connected to the driving apparatus 42.

The first baffle 412, the second baffle 413, and the pressing plate 411 are all connected to the connecting plate 415. This configuration has several advantages. On one hand, a surface of the connecting plate 415 facing the pressing plate 411 forms a portion of the inner wall of the welding chamber 41c, further enhancing the blocking effect against dust during the welding process, thereby contributing to improved welding quality of the tab 11. On the other hand, the connecting plate 415 connects the first baffle 412 and the second baffle 413, reducing the probability of deformation under pressing forces that could alter the spacing between the two baffles. Additionally, the connecting plate 415 supports the pressing plate 411 along the second direction, reducing the probability of bending or deformation of the pressing plate 411 along the second direction. This enhances the overall connection strength among the connecting plate 415, the pressing plate 411, the first baffle 412, and the second baffle 413, reducing the risk of deformation of the pressing block 41 under pressure.

The mounting base 416 is provided on a side of the connecting plate 415 facing away from the welding chamber 41c to minimize interference of the mounting base 416 with the welding device during the welding process. The driving connection between the mounting base 416 and the driving apparatus 42 helps to increase the contact area at the connection position between the pressing block 41 and the driving apparatus 42, reducing pressure during the pressing process, lowering the risk of deformation of the pressing block 41 under pressure, and helping to enhance the connection strength at the connection position of the pressing block 41.

In embodiments with the third baffle 414, referring to FIG. 3, the connecting plate 415 and the mounting base 416 are both connected to the third baffle 414 to suppress deformation of the third baffle 414 caused by forces transmitted to the third baffle 414 during the pressing of the tab 11 by the pressing block 41.

In some embodiments, the pressing block 41 is an integral structure, meaning that the pressing plate 411, the first baffle 412, the second baffle 413, the third baffle 414, the connecting baffle, and the mounting base 416 are not separately manufactured and then assembled. This further enhances the overall structural strength of the pressing block 41, suppressing the tendency of deformation under pressing forces.

The specific method of preparing the pressing block 41 as an integral structure is not limited. For example, it may be manufactured by milling a single piece of material or by additive manufacturing.

It can be understood that the welding portion of the welding device can move to extend into the welding chamber 41c, so the probability of collision between the welding portion of the welding device and the pressing block 41 needs to be reduced.

For example, referring to FIG. 3, at least one side of the welding chamber 41c along a third direction is open to form a second opening 41f, where the first direction, the second direction, and the third direction are mutually orthogonal.

It can be understood that the first opening 41d and the second opening 41f are in communication.

This allows the welding portion of the welding device to enter and exit the welding chamber 41c through the first opening 41d and the second opening 41f, increasing the number of relative movement paths between the welding portion of the welding device and the pressing block 41, enhancing operational flexibility, and reducing the probability of collision between the two.

It can be understood that, referring to FIG. 3, the connecting plate 415 is located at an end of the pressing plate 411 away from the second opening 41f along the third direction.

In embodiments where the second direction is a vertical direction, the first direction and the third direction are two mutually perpendicular directions on a horizontal plane.

The specific type of the driving apparatus 42 is not limited, such as a pen-type cylinder, a slide-table cylinder, a linear module, or a slide-table electric cylinder.

Figure 7:
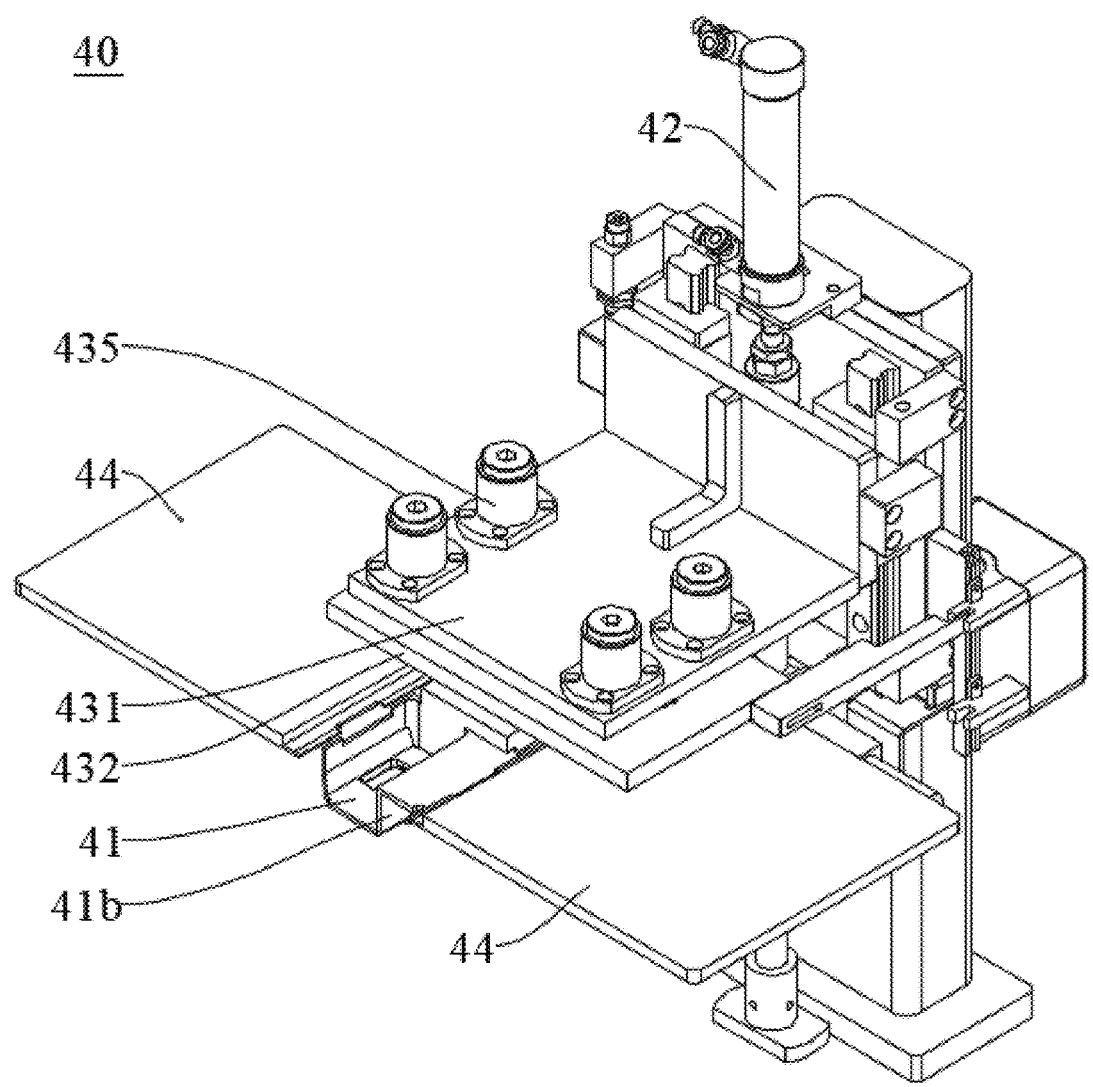
FIG. 7 is a schematic diagram of a pressing module in a fourth perspective in an embodiment of this disclosure.
Figure 8:
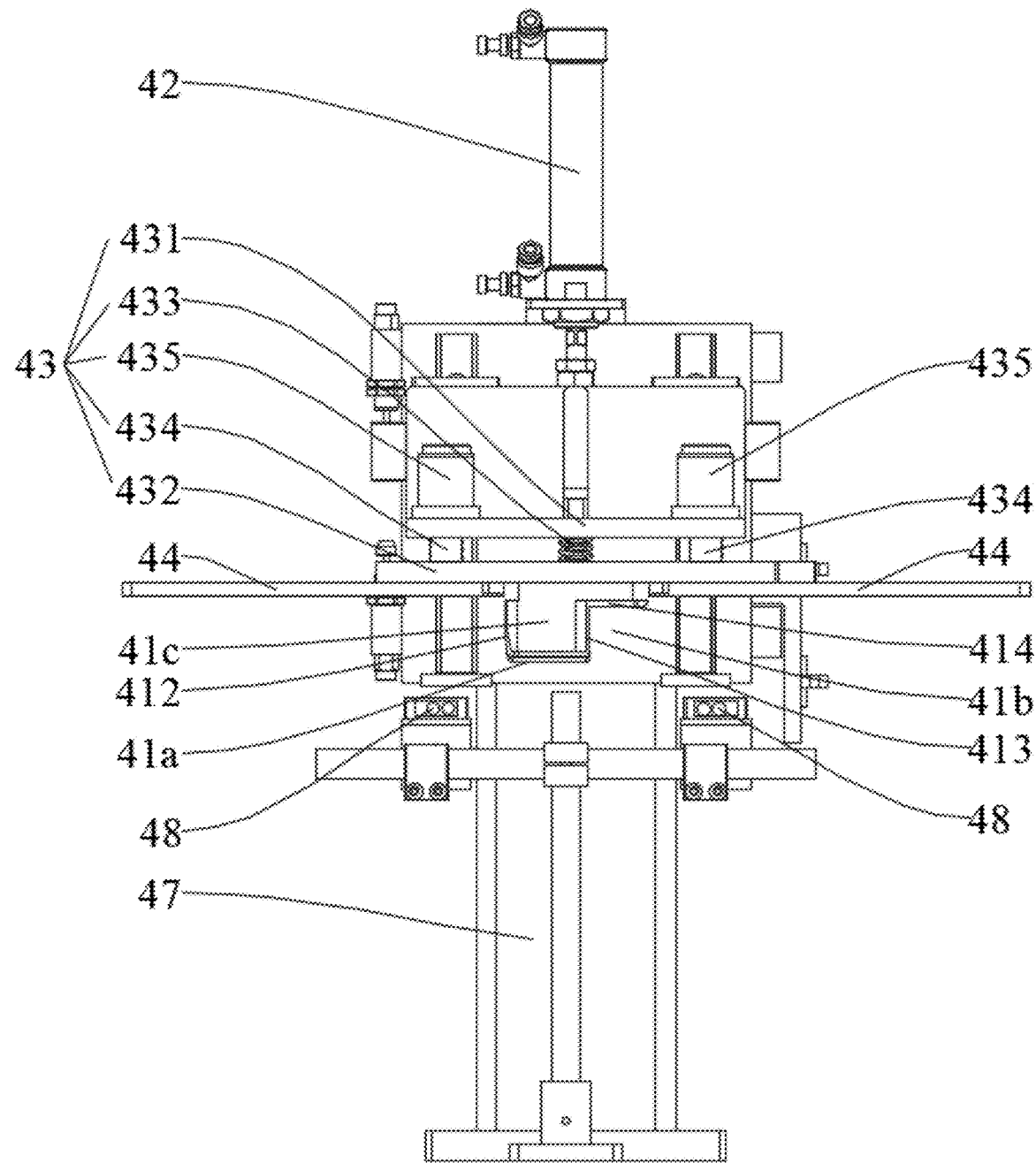
FIG. 8 is a schematic diagram of the embodiment of FIG. 7 in a fifth perspective.
Figure 9:
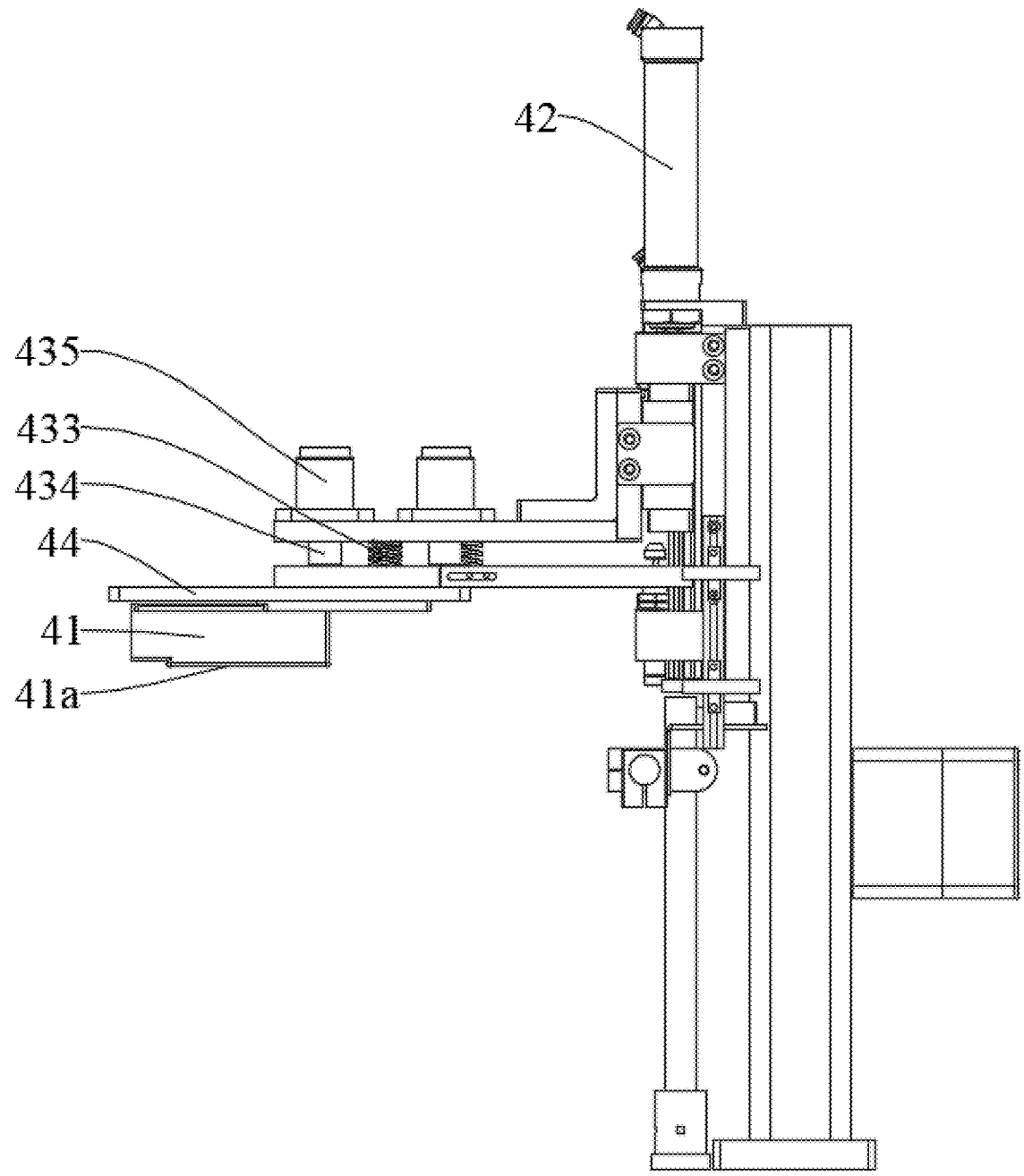
FIG. 9 is a schematic diagram of the embodiment of FIG. 7 in a sixth perspective.

In some embodiments, referring to FIG. 7 to FIG. 9, the pressing module 40 further includes an adapting assembly 43, and the adapting member is connected between a driving end of the driving apparatus 42 and the pressing block 41 to achieve an indirect connection between the driving apparatus 42 and the pressing block 41, while facilitating more flexible adjustment of the position of the pressing block 41 through the adapting assembly 43.

It can be understood that the driving force of the driving apparatus 42 to move the pressing block 41 and the pressing force required by the tab 11 from the pressing surface 41a may be the same or different in magnitude.

When the driving force of the driving apparatus 42 to move the pressing block 41 is greater than the pressing force required by the tab 11 from the pressing surface 41a, there is a risk of the pressing block 41 damaging the tab 11.

In some embodiments, referring to FIG. 7 to FIG. 9, the adapting assembly 43 includes a first adapting member 431, a second adapting member 432, and an elastic member 433. The first adapting member 431 is drivingly connected to the driving apparatus 42. The first adapting member 431 and the second adapting member 432 are spaced apart along the second direction. The elastic member 433 is connected between the first adapting member 431 and the second adapting member 432 and the elastic member 433 is capable of elastic expansion and contraction along the second direction. The second adapting member 432 is connected to the pressing block 41.

This configuration allows relative movement between the first adapting member 431 and the second adapting member 432 along the second direction, causing elastic deformation of the elastic member 433 along the second direction. The sum of the elastic force generated by the elastic member 433 and the pressing force of the pressing block 41 balances the driving force of the driving apparatus 42, ensuring that the pressing force applied by the pressing block 41 to the tab 11 remains within the designed range, thereby reducing the probability of damage to the tab 11 due to excessive pressing force.

The specific type of the elastic member 433 is not limited, such as a coil spring.

The specific number of elastic members 433 is not limited and may be one or multiple.

In some embodiments, referring to FIG. 7 to FIG. 9, the first adapting member 431 and the second adapting member 432 are both plate-shaped, with their thickness direction being the second direction, facilitating a reduction in the dimension of the adapting assembly 43 along the second direction and making the pressing module more compact.

In some embodiments, referring to FIG. 7 to FIG. 9, the adapting assembly 43 further includes a guide rod 434 and a linear bearing 435. One of the guide rod 434 and the linear bearing 435 is provided on the first adapting member 431, and the other is provided on the second adapting member 432. The guide rod 434 extends along the second direction and is inserted into the linear bearing 435.

This configuration constrains the movement of the first adapting member 431 and the second adapting member 432 along the second direction through the mutual restriction between the guide rod 434 and the linear bearing 435, reducing the probability of relative movement between the first adapting member 431 and the second adapting member 432 in a direction perpendicular to the second direction, which could prevent the pressing block 41 from pressing the tab 11. Additionally, this reduces the probability of the two ends of the elastic member 433 in the second direction moving relatively in a direction perpendicular to the second direction, which could subject the elastic member 433 to shear forces, thereby providing some protection to the elastic member 433.

The guide rod 434 and the linear bearing 435 are in rolling contact, reducing friction between them.

The specific number of guide rods 434 and linear bearings 435 is not limited and may be one or multiple. The number of guide rods 434 matches the number of linear bearings 435, with a one-to-one correspondence.

It can be understood that during the movement of the pressing block 41 toward the pressing region 30a, pre-positioning of the pressing block 41 is required to ensure that the pressing surface 41a can press the tab 11.

Specifically, referring to FIG. 3 and FIG. 6, one of the pressing region 30a and the pressing block 41 is provided with a positioning pin 31, and the other is provided with a positioning hole 41g. The positioning pin 31 protrudes along the second direction, and the positioning hole 41g is open on a side facing the positioning pin 31 along the second direction. The positioning pin 31 is capable of being inserted into the positioning hole 41g along the second direction.

This configuration allows the positioning pin 31 to be inserted into the positioning hole 41g before the pressing block 41 reaches a preset pressing position. The inner wall of the positioning hole 41g forms a stopping fit with the positioning pin 31 perpendicular to the second direction, constraining the relative position between the pressing block 41 and the pressing region 30a perpendicular to the second direction, thus enabling the pressing block 41 to more accurately press the tab 11 at a preset position.

The specific number of positioning pins 31 and positioning holes 41g is not limited and may be one or multiple. The number of positioning pins 31 matches the number of positioning holes 41g, with a one-to-one correspondence.

It can be understood that an end of the positioning pin 31 facing the positioning hole 41g is provided with a rounded chamfer or a sloped chamfer to provide guidance, facilitating more accurate insertion of the positioning pin 31 into the positioning hole 41g.

In some embodiments, referring to FIG. 6, the positioning hole 41g or the positioning pin 31 is provided on the pressing surface 41a.

It can be understood that during the pressing of the tab 11 by the pressing block 41, the electrode assembly 10 may experience a dragging force due to the pressing force on the tab 11, potentially causing relative movement relative to the carrier 30 perpendicular to the second direction, thus posing a risk to welding quality.

In some embodiments, referring to FIG. 7 to FIG. 9, the pressing module 40 further includes at least two leveling plates 44, and the two leveling plates 44 are spaced apart along the first direction. The pressing block 41 is provided between the two leveling plates 44. The driving apparatus 42 is drivingly connected to the leveling plates 44, which are configured to press the electrode assemblies 10 in the placement regions 30b along the second direction, respectively.

In other words, under the driving action of the driving apparatus 42, the leveling plates 44 and the pressing block 41 move together toward the carrier 30, and when the pressing surface 41a presses the tab 11, the leveling plates 44 press the electrode assemblies 10.

This configuration allows contact between the leveling plates 44 and the electrode assemblies 10, where friction between them suppresses the tendency of the electrode assemblies 10 to move during the welding process. Additionally, the leveling plates 44 shield the electrode assemblies 10, reducing the adverse effects of dust from the welding process on the electrode assemblies 10.

Referring to FIG. 8, the leveling plates 44 are provided on the second adapting member 432, enabling the leveling plates 44 to move along the second direction with the second adapting member 432.

In some embodiments, referring to FIG. 8, the pressing module 40 further includes a frame 47, and the frame 47 is used to fixedly accommodate the driving apparatus 42.

It can be understood that the adapting assembly 43 and the pressing block 41 are both provided on a side of the frame 47 close to the carrier along the third direction.

It can be understood that after prolonged pressing operations by the pressing module 40, there is a risk of loosening at the connection position between the driving end of the driving apparatus 42 and the adapting assembly 43, increasing the error between the actual travel and the theoretical travel of the pressing block 41 driven by the driving apparatus 42 along the second direction, posing risks of over-pressing or under-pressing.

In some embodiments, referring to FIG. 2 and FIG. 4, the adapting assembly 43 further includes a shield member 436, and the shield member 436 is provided on the second adapting member 432. The frame 47 is provided with a pressing position sensor 45 and a separation position sensor 46, and the pressing position sensor 45 and the separation position sensor 46 are spaced apart along the second direction. The pressing position sensor 45 is located on a side of the separation position sensor 46 close to the carrier 30 along the second direction. The shield member 436 is capable of entering a sensing region of the pressing position sensor 45 and a sensing region of the separation position sensor 46 along the second direction, separately.

The driving apparatus 42 drives the second adapting member 432 and the pressing block 41 to move along the second direction toward the electrode assembly 10. The shield member 436 moves with the second adapting member 432 along the second direction into the sensing region of the pressing position sensor 45, triggering the pressing position sensor 45 to emit a signal indicating that the pressing block 41 has reached the preset pressing position, thereby controlling the driving apparatus 42 to stop driving the second adapting member 432 and the pressing block 41 to continue moving along the second direction.

The driving apparatus 42 drives the second adapting member 432 to move along the second direction away from the electrode assembly 10. The shield member 436 moves with the second adapting member 432 along the second direction into the sensing region of the separation position sensor 46, triggering the separation position sensor 46 to emit a signal indicating that the pressing block 41 has reached a preset separation position, thereby controlling the driving apparatus 42 to stop driving the second adapting member 432 and the pressing block 41 to continue moving along the second direction.

This configuration allows the pressing position sensor 45 and the separation position sensor 46 to more accurately determine the actual position of the pressing block 41 along the second direction, reducing the probability of over-pressing or under-pressing issues with the pressing block 41.

The specific types of the pressing position sensor 45 and the separation position sensor 46 are not limited. For example, both may be slot-type photoelectric sensors, with a portion of the shield member 436 capable of entering the slot-type sensing region of the slot-type photoelectric sensor.

In some embodiments, referring to FIG. 4 and FIG. 8, the pressing module 40 includes a cell presence sensor 48, and the cell presence sensor 48 is used to confirm the presence of an electrode assembly 10 on the carrier 30.

This configuration reduces the probability of subsequent operation failures due to the electrode assembly 10 detaching from the carrier 30 during transportation of the electrode assembly 10 by the carrier 30.

The specific type of the cell presence sensor 48 is not limited, such as a through-beam fiber optic sensor or a reflective fiber optic sensor.

In some embodiments, referring to FIG. 3 to FIG. 5, the carrier 30 includes a support plate 32 and a plurality of positioning plates 33, and the plurality of positioning plates 33 extend along the second direction. The plurality of positioning plates 33 are divided into at least two groups, each group including at least two positioning plates 33. The two groups of positioning plates 33 are spaced apart along the first direction, with the pressing region 30a located between the two groups of positioning plates 33. The placement region 30b is located on a side of one group of positioning plates 33 facing away from the pressing region 30a along the first direction. Two positioning plates 33 in each group are spaced apart along a third direction to form a gap for the tab 11 to pass through and extend into the pressing region 30a, where the first direction, the second direction, and the third direction are mutually orthogonal.

In other words, a surface of a tray between the two groups of positioning plates 33 along the first direction forms the pressing region 30a, and each placement region 30b is configured corresponding to one group of positioning plates 33.

This configuration allows the electrode assemblies 10 placed in the placement regions 30b to abut the positioning plates 33 along the first direction, ensuring that the spacing between different electrode assemblies 10 along the first direction meets design requirements through at least two groups of positioning plates 33. This helps the relative positioning between the adapting piece 20 and the tab 11 along the first direction to meet design requirements, effectively reducing the probability of the electrode assemblies 10 moving along the first direction during the welding process, thereby contributing to improved quality of the welded product.

It can be understood that the pressing region 30a, the placement regions 30b, and the positioning plates 33 are all located on the same side of the support plate 32.

The specific method of forming the placement regions 30b is not limited.

In some embodiments, referring to FIG. 2, FIG. 4, and FIG. 5, the carrier 30 further includes a plurality of first stop members 34, and the plurality of first stop members 34 are divided into at least two groups, each group including at least two first stop members 34 spaced apart along the third direction. At least one group of first stop members 34 is located on a side of one group of positioning plates 33 facing away from the pressing region 30a along the first direction and, together with this group of positioning plates 33, encloses the placement region 30b. The first stop members 34 are configured to form a stopping fit with the electrode assembly 10 along the third direction.

This configuration restricts the movement range of the electrode assembly 10 in the placement region 30b along the third direction through at least one group of first stop members 34, facilitating positional stability of the electrode assembly 10 during the welding process, thereby contributing to improved welding quality.

It can be understood that at least a portion of the first stop members 34 and the positioning plates 33 are located on the same side of the support plate 32.

In some embodiments, referring to FIG. 2, FIG. 4, and FIG. 5, the carrier 30 further includes at least two second stop members 35, and the second stop members 35 are located on a side of one group of positioning plates 33 along the first direction and spaced apart from this group of positioning plates 33 along the first direction to collectively enclose the placement region 30b. The second stop members 35 are configured to form a stopping fit with the electrode assembly 10 along the first direction.

This configuration allows the positioning members and the second stop members 35 to collectively restrict the movement range of the electrode assembly 10 in the placement region 30b along the first direction, facilitating positional stability of the electrode assembly 10 during the welding process, thereby contributing to improved welding quality.

In some embodiments, referring to FIG. 2, the carrier 30 is provided with a positioning groove 30c, and the positioning groove 30c is open on a side perpendicular to a transport direction of the carrier 30. This allows other components on the production line to be inserted into the positioning groove 30c and form a stopping fit with an inner wall of the positioning groove 30c, achieving positional fixing of the carrier 30 along its transport direction and reducing the probability of welding failure due to carrier 30 movement during the welding process.

It can be understood that at least a portion of the second stop members 35 and the positioning plates 33 are located on the same side of the support plate 32.

A description of a welding positioning apparatus in a specific embodiment of this disclosure is as follows:

The welding positioning apparatus includes a carrier 30 and a pressing module 40. The pressing module 40 includes a pressing block 41, a driving apparatus 42, and an adapting assembly 43. The pressing block 41 includes a pressing plate 411, a first baffle 412, a second baffle 413, a third baffle 414, a connecting plate 415, a mounting base 416, and at least two leveling plates 44. The first baffle 412 and the second baffle 413 are spaced apart along a first direction and both extend along a second direction. The pressing plate 411 is connected between the first baffle 412 and the second baffle 413 and is located at an end of both baffles close to a pressing region 30a along the second direction. At least a portion of a surface of the pressing plate 411 facing the pressing region 30a forms a pressing surface 41a. The pressing plate 411, the first baffle 412, and the second baffle 413 collectively enclose a welding chamber 41c. The pressing plate 411 is provided with a welding hole 41e penetrating along the second direction. An avoidance space 41b is provided on a side of the second baffle 413 facing away from the pressing plate 411 along the first direction. An end of the second baffle 413 away from the pressing plate 411 along the second direction is connected to the third baffle 414. The third baffle 414 extends along the first direction in a direction away from the pressing plate 411. The second baffle 413 and the third baffle 414 collectively enclose the avoidance space 41b. The connecting plate 415 extends along the second direction and is connected between the first baffle 412 and the second baffle 413. An end of the connecting plate 415 close to the pressing region 30a along the second direction is connected to the pressing plate 411. The connecting plate 415, the pressing plate 411, the first baffle 412, and the second baffle 413 collectively enclose the welding chamber 41c. The mounting base 416 is provided at an end of the connecting plate 415 away from the pressing region 30a along the second direction and is located on a side of the connecting plate 415 facing away from the welding chamber 41c. The mounting base 416 extends perpendicular to the second direction and the mounting base 416 is drivingly connected to the driving apparatus 42. The pressing surface 41a is configured to press a portion of the tab 11 of an electrode assembly 10 along the second direction. The avoidance space 41b is configured to accommodate another portion of the tab 11 of the electrode assembly 10 when the pressing surface 41a presses a portion of the tab 11 of the electrode assembly 10. The adapting assembly 43 includes a first adapting member 431, a second adapting member 432, an elastic member 433, a guide rod 434, and a linear bearing 435. The first adapting member 431 is drivingly connected to the driving apparatus 42. The first adapting member 431 and the second adapting member 432 are spaced apart along the first direction. The elastic member 433 is connected between the first adapting member 431 and the second adapting member 432 and the elastic member 433 is capable of elastic expansion and contraction along the second direction. One of the guide rod 434 and the linear bearing 435 is provided on the first adapting member 431, and the other is provided on the second adapting member 432. The guide rod 434 extends along the first direction and is inserted into the linear bearing 435. One of the pressing region 30a and the pressing block 41 is provided with a positioning pin 31, and the other is provided with a positioning hole 41g. The positioning pin 31 protrudes along the first direction, and the positioning hole 41g is open on a side facing the positioning pin 31 along the first direction. The positioning pin 31 is capable of being inserted into the positioning hole 41g along the first direction. Two leveling plates 44 are spaced apart along the first direction, and the pressing block 41 is provided between the two leveling plates 44. The driving apparatus 42 is drivingly connected to the leveling plates 44, and the leveling plates 44 are configured to press the electrode assemblies 10 in placement regions 30b along the second direction, respectively. The carrier 30 includes a support plate 32 and a plurality of positioning plates 33, and the plurality of positioning plates 33 extend along the second direction. The plurality of positioning plates 33 are divided into at least two groups, each group including at least two positioning plates 33. The two groups of positioning plates 33 are spaced apart along the first direction, with the pressing region 30a located between the two groups of positioning plates 33. The placement region 30b is located on a side of one group of positioning plates 33 facing away from another group of positioning plates 33 along the first direction. Two positioning plates 33 in each group are spaced apart along a third direction to form a gap for the tab 11 to pass through and extend into the pressing region 30a, where the first direction, the second direction, and the third direction are mutually orthogonal.

An embodiment of this disclosure further provides a battery production line for welding a tab 11 of an electrode assembly 10 to an adapting piece 20. The battery production line includes a welding device, a transport module, and the welding positioning apparatus according to any of the aforementioned embodiments. The welding device is configured to weld the tab 11 and the adapting piece 20 when the pressing surface 41a presses the tab 11 of one electrode assembly 10. The transport module is drivingly connected to the carrier 30 to drive the carrier 30 to move.

This configuration improves the positional accuracy of the welding operation of the welding device through the pressing and positioning of the electrode assembly 10 and the adapting piece 20 by the welding positioning apparatus. The avoidance space 41b accommodates the tab 11 not requiring welding in the current process, facilitating improved welding quality in subsequent welding operation. The transport module drives the carrier 30 to move, adjusting the position of the carrier 30 to facilitate loading and unloading operations while enabling unwelded electrode assemblies 10 and adapting pieces 20 to move to a preset operation position corresponding to the welding device.

The specific type of the welding device is not limited, such as an ultrasonic welding device.

The specific type of the transport module is not limited. For example, the transport module includes a guide rail, a conveyor belt, and a driving member. The carrier 30 is slidably fitted with the guide rail, the conveyor belt is fixedly connected to the carrier 30, and the driving member is drivingly connected to the conveyor belt to drive the conveyor belt to move, thereby pulling the carrier 30 to move.

In some embodiments, the battery production line further includes a positioning module, and the positioning end of the positioning module is telescopically configurable for insertion into a positioning groove 30c to fix the position of the carrier 30.

The specific type of the positioning module is not limited. For example, the positioning module is a cylinder, and the positioning end is an end of a driving rod of the cylinder.

An embodiment of this disclosure further provides a welding method for welding a tab of an electrode assembly to an adapting piece using the battery production line according to any of the aforementioned embodiments. The welding method is applied to a control device, the specific type of which is not limited, such as a PLC (Programmable Logic Controller, Programmable Logic Controller) device or an industrial control computer.

Figure 10:
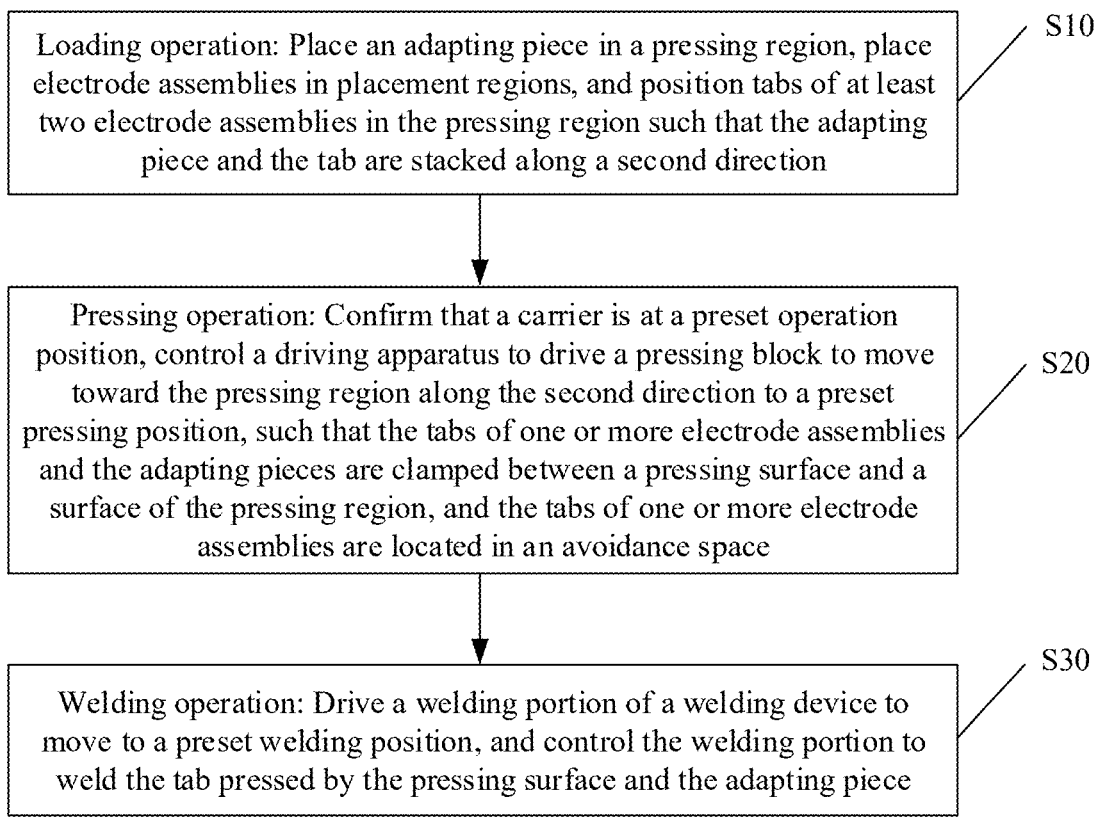
FIG. 10 is a step schematic diagram of a welding method in an embodiment of this disclosure.

Referring to FIG. 10, the welding method includes:

Step S10: Loading operation: Place the adapting piece in the pressing region, place the electrode assemblies in the placement regions, and position the tabs of at least two electrode assemblies in the pressing region such that the adapting piece and the tab are stacked along the second direction.

It can be understood that the adapting piece is located between the pressing region and the tab.

Step S20: Pressing operation: Confirm that the carrier is at a preset operation position, control the driving apparatus to drive the pressing block to move toward the pressing region along the second direction to a preset pressing position, such that the tabs of one or more electrode assemblies and the adapting pieces are clamped between the pressing surface and a surface of the pressing region, and the tabs of one or more electrode assemblies are located in the avoidance space.

The preset operation position refers to a pre-designated position for performing the welding operation.

The adapting piece 20 and the tab 11 requiring welding in the current process are pressed using the pressing surface 41a and the pressing region 30a, which help the welding device to weld them together. The avoidance space 41b accommodates the tab 11 not requiring welding in the current process.

Step S30: Welding operation: Drive a welding portion of the welding device to move to a preset welding position, and control the welding portion to weld the tab pressed by the pressing surface and the adapting piece.

The welding method in this disclosure allows for accommodation of the tab 11 not requiring welding in the current process within the avoidance space 41b, reducing the probability of damage to the tab 11 not requiring welding in the current process due to pressure, thereby ensuring that the welding quality of the tab 11 in subsequent welding meets technical requirements.

It can be understood that after the welding operation step, the welded electrode assembly 10 is removed from the carrier 30, or the carrier 30 is moved to a preset operation position corresponding to other unwelded tabs 11.

In some embodiments, the step of confirming that the carrier is at the preset operation position specifically includes:
controlling the transport module to drive the carrier to move along a transport direction to the preset operation position; and
controlling the positioning end of the positioning module to be inserted into a positioning groove of the carrier, such that an inner wall of the positioning groove forms a stopping fit with the positioning end along the transport direction.

This configuration achieves positional fixing of the carrier 30 along its transport direction through the stopping fit between the inner wall of the positioning groove 30c and the positioning end, reducing the probability of welding failure due to carrier 30 movement during the welding process.

The specific method of the transport module driving the carrier 30 to move to the preset operation position is not limited. For example, the carrier 30 is disposed on a slide rail, multiple carriers 30 are connected end-to-end, and a mover of a linear motor is connected to at least one carrier 30. The movement and stopping of the mover of the linear motor drag the carriers 30 to move and stop, thereby controlling the position of the mover of the linear motor to achieve the purpose of controlling the carrier 30 to move to the preset operation position.

In some embodiments, before the step of controlling the driving apparatus to drive the pressing block to move toward the pressing region along the second direction to the preset pressing position, the welding method further includes:

acquiring a cell presence signal emitted by a cell presence sensor when the electrode assembly in the placement region blocks a light beam emitted by the cell presence sensor.

When the carrier 30 is at the preset operation position, a light beam emitted by a transmitting end of the cell presence sensor 48 is directed toward the placement region 30b. If the emitted light beam passes through the placement region 30b and is received by a receiving end of the cell presence sensor 48 located on the opposite side of the placement region 30b, or if the intensity of reflected light received by the receiving end of the cell presence sensor 48 does not meet a set value range, this indicates that the electrode assembly 10 has detached from the placement region 30b. The cell presence sensor 48 emits a cell absence signal, and subsequent operations are halted. If the receiving end of the cell presence sensor 48 on the opposite side of the placement region 30b fails to receive the light beam, or if the intensity of reflected light received by the receiving end of the cell presence sensor 48 meets the set value range, this indicates that an electrode assembly 10 is present in the placement region 30b. The cell presence sensor 48 emits a cell presence signal, and the control device responds to this signal to control the continuation of subsequent operations.

This configuration enables better monitoring of the state of the electrode assembly 10 in the carrier 30, reducing the risk of material waste in subsequent welding operation due to the electrode assembly 10 falling off during movement with the carrier 30.

In some embodiments, the step of controlling the driving apparatus to drive the pressing block to move toward the pressing region along the second direction to the preset pressing position specifically includes:

controlling the driving apparatus to drive the adapting assembly to move toward the pressing region along the second direction until it is confirmed that the shield member of the adapting assembly enters the sensing region of the pressing position sensor.

This configuration reduces the adverse effects of positional errors of the pressing block 41 along the second direction due to loosening of the connection between the adapting assembly 43 and the driving apparatus or between components within the adapting assembly 43, enabling more accurate determination of the actual position of the pressing block 41 along the second direction and reducing the probability of over-pressing or under-pressing issues with the pressing block 41.

The various embodiments/implementations provided in this disclosure can be combined with each other without contradiction.

The above are merely preferred embodiments of this disclosure and are not intended to limit the embodiments of this disclosure. For persons skilled in the art, various modifications and changes can be made to the embodiments of this disclosure. Any modifications, equivalent replacements, improvements, and the like made within the spirit and principles of the embodiments of this disclosure shall be included within the scope of protection of the embodiments of this disclosure.

What is claimed is:

1. A welding positioning apparatus for welding a tab of an electrode assembly to an adapting piece, comprising:

a carrier comprising a pressing region and at least two placement regions for placing individual electrode assemblies, wherein the pressing region is formed between two placement regions spaced apart along a first direction, and the pressing region is configured to accommodate the tab and the adapting piece; and a pressing module comprising a pressing block and a driving apparatus, wherein the driving apparatus is drivingly connected to the pressing block to drive the pressing block to move toward the pressing region along a second direction, the second direction is orthogonal to the first direction, a side of the pressing block facing the pressing region is provided with a pressing surface and an avoidance space, the pressing surface is configured to press a portion of the tab of the electrode assembly along the second direction, the avoidance space is located on a side of the pressing surface along the first direction and is open on a side facing the pressing region, and the avoidance space is configured to accommodate another portion of the tab of the electrode assembly when the pressing surface presses a portion of the tab of the electrode assembly, wherein the pressing block is provided with a welding chamber, the welding chamber is located on a side of the pressing surface facing away from the pressing region, a side of the welding chamber away from the pressing surface along the second direction is open to form a first opening, an inner wall of the welding chamber on a side close to the pressing surface along the second direction is provided with a welding hole, and the welding hole penetrates the pressing block along the second direction, wherein the pressing block comprises a pressing plate, a first baffle, and a second baffle, the first baffle and the second baffle are spaced apart along the first direction and both extend along the second direction, the pressing plate is connected between the first baffle and the second baffle and is located at an end of both baffles close to the pressing region along the second direction, at least a portion of a surface of the pressing plate facing the pressing region forms the pressing surface, the pressing plate, the first baffle, and the second baffle collectively enclose the welding chamber, the welding hole is provided on the pressing plate, wherein the pressing block further comprises a connecting plate and a mounting base, the connecting plate extends along the second direction and is connected between the first baffle and the second baffle, an end of the connecting plate close to the pressing region along the second direction is connected to the pressing plate, the connecting plate, the pressing plate, the first baffle, and the second baffle collectively enclose the welding chamber, the mounting base is provided at an end of the connecting plate away from the pressing region along the second direction and is located on a side of the connecting plate facing away from the welding chamber, the mounting base extends perpendicular to the second direction, and the mounting base is drivingly connected to the driving apparatus.

2. The welding positioning apparatus according to claim 1, wherein a side of the avoidance space facing away from the pressing surface along the first direction is open.

3. The welding positioning apparatus according to claim 1, wherein the avoidance space is provided on a side of the second baffle facing away from the pressing plate along the first direction.

4. The welding positioning apparatus according to claim 3, wherein at least a portion of a side surface of the second baffle facing away from the first baffle is a sloped surface, the sloped surface is located at an end of the second baffle close to the pressing region along the second direction, and the sloped surface gradually moves away from the pressing plate in a direction away from the pressing region.

5. The welding positioning apparatus according to claim 3, wherein the pressing block further comprises a third baffle, an end of the second baffle away from the pressing plate along the second direction is connected to the third baffle, the third baffle extends along the first direction in a direction away from the pressing plate, and the second baffle and the third baffle collectively enclose the avoidance space.

6. The welding positioning apparatus according to claim 1, wherein at least one side of the welding chamber along a third direction is open to form a second opening, and the first direction, the second direction, and the third direction are mutually orthogonal.

7. The welding positioning apparatus according to claim 1, wherein the pressing module further comprises an adapting assembly, the adapting assembly comprises a first adapting member, a second adapting member, and an elastic member, the first adapting member is drivingly connected to the driving apparatus, the first adapting member and the second adapting member are spaced apart along the second direction, the elastic member is connected between the first adapting member and the second adapting member, the elastic member is capable of elastic expansion and contraction along the second direction, and the second adapting member is connected to the pressing block.

8. The welding positioning apparatus according to claim 7, wherein the adapting assembly further comprises a guide rod and a linear bearing, one of the guide rod and the linear bearing is provided on the first adapting member, the other is provided on the second adapting member, and the guide rod extends along the second direction and is inserted into the linear bearing.

9. The welding positioning apparatus according to claim 7, wherein the pressing module further comprises a frame, the adapting assembly further comprises a shield member, the shield member is provided on the second adapting member, the frame is provided with a pressing position sensor and a separation position sensor, the pressing position sensor and the separation position sensor are spaced apart along the second direction, the pressing position sensor is located on a side of the separation position sensor close to the carrier along the second direction, and the shield member is capable of entering a sensing region of the pressing position sensor and a sensing region of the separation position sensor along the second direction, separately.

10. The welding positioning apparatus according to claim 1, wherein one of the pressing region and the pressing block is provided with a positioning pin, the other is provided with a positioning hole, the positioning pin protrudes along the second direction, the positioning hole is open on a side facing the positioning pin along the second direction, and the positioning pin is capable of being inserted into the positioning hole along the second direction.

11. The welding positioning apparatus according to claim 1, wherein the pressing module further comprises at least two leveling plates, the two leveling plates are spaced apart along the first direction, the pressing block is provided between the two leveling plates, the driving apparatus is drivingly connected to the leveling plates, and the leveling plates are configured to press the electrode assemblies in the placement regions along the second direction, respectively.

12. The welding positioning apparatus according to claim 1, wherein the carrier comprises a support plate and a plurality of positioning plates, the plurality of positioning plates extend along the second direction, the plurality of positioning plates are divided into at least two groups, each group comprising at least two positioning plates, the two groups of positioning plates are spaced apart along the first direction with the pressing region located between the two groups of positioning plates, the placement region is located on a side of one group of positioning plates facing away from the pressing region along the first direction, two positioning plates in each group are spaced apart along a third direction to form a gap for the tab to pass through and extend into the pressing region, and the first direction, the second direction, and the third direction are mutually orthogonal.

13. The welding positioning apparatus according to claim 12, wherein the carrier further comprises a plurality of first stop members, the plurality of first stop members are divided into at least two groups, each group comprising at least two first stop members spaced apart along the third direction, at least one group of first stop members is located on a side of one group of positioning plates facing away from the pressing region along the first direction and, together with this group of positioning plates, encloses the placement region, and the first stop members are configured to form a stopping fit with the electrode assembly along the third direction;

and/or, the carrier further comprises at least two second stop members, and the second stop members are located on a side of one group of positioning plates along the first direction and spaced apart from this group of positioning plates along the first direction to collectively enclose the placement region, and the second stop members are configured to form a stopping fit with the electrode assembly along the first direction.

14. A battery production line for welding a tab of an electrode assembly to an adapting piece, the battery production line comprising a welding device, a transport module, and the welding positioning apparatus according to claim 1, wherein the welding device is configured to weld the tab and the adapting piece when the pressing surface presses the tab of one electrode assembly, and the transport module is drivingly connected to the carrier to drive the carrier to move.

15. A welding method for welding a tab of an electrode assembly to an adapting piece using the battery production line according to claim 14, the welding method comprising:
loading operation: placing the adapting piece in the pressing region, placing the electrode assemblies in the placement regions, and positioning the tabs of at least two electrode assemblies in the pressing region such that the adapting piece and the tab are stacked along the second direction;
pressing operation: confirming that the carrier is at a preset operation position, and controlling the driving apparatus to drive the pressing block to move toward the pressing region along the second direction to a preset pressing position, such that the tabs of one or more electrode assemblies and the adapting pieces are clamped between the pressing surface and a surface of the pressing region, and the tabs of one or more electrode assemblies are located in the avoidance space; and welding operation: driving a welding portion of the welding device to move to a preset welding position, and controlling the welding portion to weld the tab pressed by the pressing surface and the adapting piece.

16. The welding method according to claim 15, wherein the battery production line further comprises a positioning module, and a positioning end of the positioning module is telescopically configurable; and the confirming that the carrier is at the preset operation position specifically comprises:

controlling the transport module to drive the carrier to move along a transport direction to the preset operation position; and controlling the positioning end to be inserted into a positioning groove of the carrier, such that an inner wall of the positioning groove forms a stopping fit with the positioning end along the transport direction.

17. The welding method according to claim 15, wherein before the controlling the driving apparatus to drive the pressing block to move toward the pressing region along the second direction to a preset pressing position, the welding method further comprises:

acquiring a cell presence signal emitted by a cell presence sensor when the electrode assembly in the placement region blocks a light beam emitted by the cell presence sensor.

18. The welding method according to claim 15, wherein the controlling the driving apparatus to drive the pressing block to move toward the pressing region along the second direction to a preset pressing position specifically comprises:

controlling the driving apparatus to drive the adapting assembly to move toward the pressing region along the second direction until it is confirmed that the shield member of the adapting assembly enters the sensing region of the pressing position sensor.

* * * * *